(12) United States Patent
Zhou

(10) Patent No.: US 10,980,038 B2
(45) Date of Patent: Apr. 13, 2021

(54) DATA TRANSMISSION METHOD, USER EQUIPMENT, AND BASE STATION

(71) Applicant: Huawei Technologies Co., Ltd., Guangdong (CN)

(72) Inventor: Ping Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 16/240,559

(22) Filed: Jan. 4, 2019

(65) Prior Publication Data

US 2019/0141724 A1 May 9, 2019

Related U.S. Application Data

(63) Continuation of application No. PCT/CN2016/089093, filed on Jul. 7, 2016.

(51) Int. Cl.
| | |
|---|---|
| *H04W 74/08* | (2009.01) |
| *H04W 72/12* | (2009.01) |
| *H04B 17/318* | (2015.01) |
| *H04L 1/18* | (2006.01) |
| *H04L 5/00* | (2006.01) |
| *H04W 64/00* | (2009.01) |
| *H04W 72/14* | (2009.01) |

(52) U.S. Cl.
CPC ........ *H04W 72/121* (2013.01); *H04B 17/318* (2015.01); *H04L 1/1812* (2013.01); *H04L 5/0048* (2013.01); *H04L 5/0055* (2013.01); *H04W 64/00* (2013.01); *H04W 72/14* (2013.01); *H04W 74/08* (2013.01); *H04W 74/0833* (2013.01)

(58) Field of Classification Search
CPC ...... H04W 76/00; H04W 88/08; H04W 72/04
See application file for complete search history.

(56) References Cited

U.S. PATENT DOCUMENTS

| | | | | |
|---|---|---|---|---|
| 9,167,586 | B1 | 10/2015 | Prock et al. | |
| 10,218,478 | B2 * | 2/2019 | Kim | ........................ H04B 7/088 |
| 2010/0290399 | A1 * | 11/2010 | Willenegger | .......... H04B 1/707 370/328 |
| 2010/0297936 | A1 * | 11/2010 | Nan | .................. H04W 72/1263 455/7 |

(Continued)

FOREIGN PATENT DOCUMENTS

| | | |
|---|---|---|
| CN | 101860966 A | 10/2010 |
| CN | 102149145 A | 8/2011 |

(Continued)

*Primary Examiner* — Michael J Moore, Jr.
*Assistant Examiner* — Prenell P Jones
(74) *Attorney, Agent, or Firm* — Slater Matsil, LLP

(57) ABSTRACT

This application provides a data transmission method, user equipment, and a base station. The method is applied to a scheduling-free scenario of the base station for the user equipment UE, and the method includes: determining, by the UE, a target resource group from a plurality of transmission resource groups; and sending, by the UE, data to the base station by using a transmission resource in the target resource group, so that the base station performs data processing on the data by using a transmission format corresponding to the target resource group.

14 Claims, 9 Drawing Sheets

(56) References Cited

U.S. PATENT DOCUMENTS

| | | | | |
|---|---|---|---|---|
| 2010/0298018 A1* | 11/2010 | Baker | ............... | H04L 1/0083 455/509 |
| 2012/0044816 A1 | 2/2012 | Ratasuk et al. | | |
| 2013/0010720 A1 | 1/2013 | Lohr et al. | | |
| 2013/0159533 A1* | 6/2013 | Brown | ............... | H04N 21/2405 709/226 |
| 2013/0315192 A1* | 11/2013 | Seo | ............... | H04W 72/04 370/329 |
| 2014/0078985 A1 | 3/2014 | Kanamarlapudi et al. | | |
| 2014/0112254 A1* | 4/2014 | Lindoff | ............... | H04W 74/002 370/328 |
| 2014/0254455 A1 | 9/2014 | Nikopour et al. | | |
| 2015/0009911 A1* | 1/2015 | Li | ............... | H04L 5/0037 370/329 |
| 2015/0043540 A1* | 2/2015 | Nikopour | ............... | H04W 72/048 370/335 |
| 2015/0304891 A1* | 10/2015 | Dinan | ............... | H04L 69/28 370/331 |
| 2016/0270042 A1* | 9/2016 | Nikopour | ............... | H04W 72/042 |
| 2017/0164242 A1 | 6/2017 | Zhang et al. | | |
| 2018/0242309 A1* | 8/2018 | Au | ............... | H04L 1/0045 |
| 2018/0242310 A1* | 8/2018 | Au | ............... | H04W 74/0866 |

FOREIGN PATENT DOCUMENTS

| | | |
|---|---|---|
| CN | 104581974 A | 4/2015 |
| CN | 104640159 A | 5/2015 |
| CN | 105359565 A | 2/2016 |
| EP | 3171652 A1 | 5/2017 |
| JP | 2017528982 A | 9/2017 |
| WO | 2014135126 A1 | 9/2014 |
| WO | 2016026087 A1 | 2/2016 |
| WO | 2016057248 A1 | 4/2016 |

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2016/089093 filed on Jul. 7, 2016, the disclosure of which is hereby incorporated by reference in its entirety.

TECHNICAL FIELD

The present application relates to the communications field, and in particular, to a data transmission method, user equipment, and a base station in the communications field.

BACKGROUND

In recent years, with continuous development of an Internet of Things (IoT) application, a conventional wireless communications system has been extended to a communication application between machines, namely, machine type communication (MTC). Different from a conventional communication service, a communication service of the MTC is mainly characterized by a small transmission packet, insensitivity to a transmission delay, and a large quantity of users.

A fifth generation mobile communications (5G) technology research currently being actively discussed has made an MTC service one of important 5G service research scenarios. It is mainly that a current third generation mobile communications (3G) technology and a fourth generation mobile communications (4G) technology are not highly efficient for supporting the MTC service, and cannot meet a requirement of future 5G In a massive connectivity scenario, a quantity of links proposed by a 5G standard organization needs to reach 10 raised to the power of 6 per square kilometer. A quantity of access users is 1000 to 10000 times larger than that of existing Long Term Evolution (LTE) system users. If a massive connectivity communications system still uses an original transmission manner based on base station scheduling, scheduling overheads of a user sharply increase. To reduce uplink scheduling overheads of user equipment in the massive connectivity scenario, it is considered that although there are large quantities of users in massive connectivity, frequency for sending a packet of the user is not high, the packet is usually sent once every few minutes, and a packet size is usually tens to hundreds of bytes. Therefore, it is relatively suitable to use a mechanism of scheduling-free transmission. Therefore, a scheduling-free transmission scheme based on user contention has been widely studied and discussed in the industry.

A system coverage capability in the massive connectivity scenario directly affects a quantity of users of a link. If coverage of the communications system is limited, this means that a quantity of potential users is limited. However, a current scheduling-free transmission scheme is poor in coverage of a network.

Because the system is scheduling-free in the massive connectivity, it means that a base station needs to blindly detect data of the user equipment at a receive end. To reduce complexity, the user equipment usually sends the data by using a fixed transmission format such as a modulation and coding scheme (MCS) or a resource block (RB), and the base station receives a data packet based only on the fixed MCS or RB of the user equipment (UE). Therefore, for users of different coverage, a conventional adaptive modulation and coding (AMC) cannot be used, causing limited performance of the system. Because system resources are relatively redundant and wasteful if all designs are based on a capability of user equipment of edge coverage. However, transmission performance of the user equipment of edge coverage is damaged if all designs are based on user equipment at a medium coverage level.

Therefore, in the current scheduling-free transmission scheme, the base station cannot adaptively configure an appropriate transmission format for the user equipment based on a coverage level of the user equipment to process the data sent by the user equipment.

SUMMARY

In view of this, embodiments of the present application provide a data transmission method, user equipment, and a base station, so as to resolve a problem that the base station cannot flexibly process, for a coverage situation of the user equipment, data sent by the user equipment in a scheduling-free transmission process.

According to a first aspect, a data transmission method is provided, where the method is applied to a scheduling-free scenario of a base station for user equipment UE, and the method includes:

determining, by the UE, a target resource group from a plurality of transmission resource groups; and sending, by the UE, data to the base station by using a transmission resource in the target resource group, so that the base station performs data processing on the data by using a transmission format corresponding to the target resource group.

Therefore, according to the data transmission method in this embodiment of the present application, in a scheduling-free transmission process, the user equipment selects the transmission resource in the target transmission resource group from the plurality of transmission resource groups to send the data to the base station, so that the base station can flexibly configure, for a coverage situation of the user equipment, an appropriate transmission format for the user equipment, to process the data sent by the user equipment.

The transmission resource may include at least one of a preamble sequence, a pilot resource, a time domain resource, a frequency resource, a code word resource, and a beam resource.

The transmission format may include at least one of a transmission code block size, a data modulation order, and a data encoding scheme.

Optionally, the determining, by the UE, a target resource group from a plurality of transmission resource groups includes:

determining, by the UE, the coverage situation of the UE in a cell, where the coverage situation is related to a location of the UE in the cell, and the location of the UE in the cell is related to a channel transmission condition of the UE;

obtaining, by the UE, information about the plurality of transmission resource groups, where the plurality of transmission resource groups correspond to different transmission resources; and determining, by the UE based on the information about the plurality of transmission resource groups and the coverage situation of the UE, the target resource group corresponding to the coverage situation of the UE from the plurality of transmission resource groups.

A channel transmission condition of the user equipment having a same coverage situation is similar, and the base station may use a similar data processing manner for such user equipment. Therefore, a coverage situation corresponds to a specific channel condition or signal condition. For example, in an IoT system, the coverage situation of the user equipment may be classified into three types, for example, the coverage situation of the user equipment that is closer to the base station is "central coverage"; the coverage situation of the user equipment that is farther from the base station is "medium coverage"; and the coverage situation of the user equipment in a scenario such as a cell edge or a basement is "edge coverage".

When the UE is user equipment of the edge coverage, channel quality and transmitted signal quality of the UE are relatively poor, and a signal transmission power is relatively low. When the UE is in the central coverage, channel quality and transmitted signal quality of the UE are relatively good, and a signal transmission power is relatively high.

Optionally, the determining, by the UE, the coverage situation of the UE in a cell includes:

receiving, by the UE, coverage indication information that is used to indicate the coverage situation of the UE and that is sent by the base station.

Optionally, the determining, by the UE, the coverage situation of the UE in a cell includes:

determining, by the UE, the coverage situation of the UE based on a power of a last received downlink reference signal that is sent by the base station.

The downlink reference signal may be a downlink pilot reference signal, and the uplink reference signal may be an uplink pilot reference signal.

Optionally, the obtaining, by the UE, information about the plurality of transmission resource groups includes:

receiving, by the UE, the information about the plurality of transmission resource groups sent by the base station.

It should be understood that, the base station may determine the information about the plurality of transmission resource groups and send the information about the plurality of transmission resource groups to the UE so that the UE selects the target resource group from the plurality of transmission resource groups. Alternatively, the UE may autonomously select the target resource group from the plurality of transmission resource groups that are agreed in advance, for example, from a plurality of pre-classified transmission resource groups specified in a protocol.

For example, if the cell has 251 available transmission resources (corresponding to 251 preamble sequences numbered from 0 to 250) in total, the available transmission resources may be grouped as follows:

a. Edge coverage: an information bit received each time does not exceed 50 bits, a modulation order is 0, and a Polar coding scheme is used: sequences 0 to 60 and 211 to 250.

b. Medium coverage: an information bit received each time does not exceed 200 bits, a modulation order is 10, and a Turbo coding scheme is used: sequences 61 to 150.

c. Central coverage: an information bit received each time does not exceed 400 bits, a modulation order is 15, and a CC coding scheme is used: sequences 151 to 210.

For another example, if the cell has 6 available transmission resources (corresponding to 6 pilots numbered from 0 to 5) in total, the available transmission resources may be grouped as follows:

a. Edge coverage: an information bit received each time does not exceed 50 bits, a modulation order is 0, and a Polar coding scheme is used: sequences 0 and 5.

b. Medium coverage: an information bit received each time does not exceed 200 bits, a modulation order is 10, and a Turbo coding scheme is used: sequences 1 and 2.

c. Central coverage: an information bit received each time does not exceed 400 bits, a modulation order is 15, and a CC coding scheme is used: sequences 3 and 4.

It should be understood that, the grouping of the transmission resources herein may be grouping of logical transmission resources, for example, grouping of pilot resources or preamble sequences. For example, different pilot resources are classified into different transmission resource groups and therefore correspond to different coverage situations of the user equipment. However, the user equipment that uses different pilot resources may occupy a same time-frequency resource. Alternatively, the grouping of the transmission resources may be grouping of different frequency domain resources, time domain resources, or code domain resources. For example, different frequency domain resources are classified into different transmission resource groups and therefore correspond to different coverage situations. In this way, the user equipment may use a same pilot resource or preamble sequence, and distinguish the coverage situation of the user equipment by using different frequency bands.

In another embodiment, if the location of the UE in the cell is constantly moving, in other words, the coverage situation of the UE in the cell is constantly changing, in this case, the UE may periodically determine, based on the information about the plurality of transmission resource groups and the coverage situation of the UE in the cell, the target resource group corresponding to the coverage situation of the UE from the plurality of transmission resource groups. Because the UE is constantly moving, and the coverage situation of the UE is constantly changing, target resource groups determined in different times may be different.

Optionally, the determining, by the UE, a target resource group from a plurality of transmission resource groups includes:

receiving, by the UE, resource indication information that is used to indicate the target resource group and that is sent by the base station.

To be specific, in addition to sending the data on the transmission resource in the target resource group determined by the UE from the plurality of transmission resource groups, the UE can further send, based on an indication of the base station, the data on the transmission resource in the target resource group indicated by the base station.

Optionally, before the determining, by the UE, a target resource group from a plurality of transmission resource groups, the method further includes:

determining, by the UE, the coverage situation of the UE based on the power of the last received downlink reference signal that is sent by the base station; and sending, by the UE to the base station, the coverage indication information that is used to indicate the coverage situation of the UE.

Optionally, if the target resource group determined by the UE is a corresponding transmission resource group when the coverage situation of the UE in the cell is edge coverage, the method further includes:

sending, by the UE, the data to the base station in a plurality of bundled transmission time intervals TTIs, where a start TTI for sending the data is the same as a start TTI for sending data in the plurality of bundled TTIs by other UE that separately uses another transmission resource in the target resource group.

Start TTIs for sending the data by a plurality of user equipments of the edge coverage in the bundled TTIs are the same. Therefore, it is limited that the data of the user equipment in the plurality of bundled consecutive TTIs is unique. When user equipment that obtains the transmission resource by contention sends data in the bundled TTIs, the user equipment is not interfered with by data sent by other user equipment of the edge coverage.

Optionally, the plurality of bundled TTIs include consecutive TTIs or inconsecutive TTIs.

The plurality of bundled TTIs may include time-consecutive TTIs, and may also include time-inconsecutive TTIs, for example, only a TTI for uplink transmission is bundled. This mainly depends on a configuration ratio of an uplink subframe to a downlink subframe in a system. For example, a pattern of the TTI bundling may be determined by using a method that is agreed in advance based on subframe configuration.

According to a second aspect, a data transmission method is provided, where the method is applied to a scheduling-free scenario of a base station for user equipment UE, and the method includes:

receiving, by the base station on a transmission resource in a target resource group, data sent by the UE; and performing, by the base station, data processing on the data by using a transmission format corresponding to the target resource group.

Therefore, according to the data transmission method in this embodiment of the present application, the base station configures, based on the target transmission resource group of the transmission resource used when the user equipment sends the data, an appropriate transmission format for the user equipment to process the data sent by the user equipment, so that the base station can flexibly process, for the coverage situation of the user equipment in a scheduling-free transmission process, the data sent by the user equipment.

The transmission resource may include at least one of a preamble sequence, a pilot resource, a time domain resource, a frequency resource, a code word resource, and a beam resource.

The transmission format may include at least one of a transmission code block size, a data modulation order, and a data encoding scheme.

Optionally, before the receiving, by the base station on a transmission resource in a target resource group, data sent by the UE, the method further includes:

Before the receiving, by the base station on a transmission resource in a target resource group, data sent by the UE, the method further includes:

determining, by the base station, the coverage situation of the UE in a cell, where the coverage situation is related to a location of the UE in the cell, and the location of the UE in the cell is related to a channel transmission condition of the UE;

determining, by the base station, information about a plurality of transmission resource groups, where the plurality of transmission resource groups correspond to different transmission resources;

determining, by the base station based on the information about the plurality of transmission resource groups and the coverage situation of the UE, the target resource group corresponding to the coverage situation of the UE from the plurality of transmission resource groups; and sending, by the base station to the UE, resource indication information that is used to indicate the target resource group.

Optionally, the determining, by the base station, the coverage situation of the UE in a cell includes:

determining, by the base station, the coverage situation of the UE in the cell based on a power of a last received uplink reference signal that is sent by the UE.

Optionally, the determining, by the base station, the coverage situation of the UE in a cell includes:

receiving, by the base station, coverage indication information that is used to indicate the coverage situation of the UE and that is sent by the UE.

Optionally, the downlink reference signal may be a downlink pilot reference signal, and the uplink reference signal may be an uplink pilot reference signal.

Optionally, the determining, by the base station, information about a plurality of transmission resource groups includes:

classifying, by the base station, available transmission resources into the plurality of transmission resource groups.

It should be understood that, the base station may determine the information about the plurality of transmission resource groups and send the information about the plurality of transmission resource groups to the UE so that the UE selects the target resource group from the plurality of transmission resource groups. Alternatively, the UE may autonomously select the target resource group from the plurality of transmission resource groups that are agreed in advance, for example, from a plurality of pre-classified transmission resource groups specified in a protocol.

For example, if a frequency band that can be used to perform uplink data transmission by the user equipment in the cell includes frequencies 1000 MHz to 2500 MHz, the frequencies may be grouped as follows:

a. Edge coverage: an information bit received each time does not exceed 50 bits, a modulation order is 0, and a Polar coding scheme is used: frequencies 1000 MHz to 1500 MHz.

b. Medium coverage: an information bit received each time does not exceed 200 bits, a modulation order is 10, and a Turbo coding scheme is used: frequencies 1500 MHz to 2000 MHz.

c. Central coverage: an information bit received each time does not exceed 400 bits, a modulation order is 15, and a CC coding scheme is used: frequencies 2000 MHz to 2500 MHz.

For another example, when the user equipment performs the uplink data transmission, the user equipment having different coverage situations may use different subframes to transmit the data, and the subframes may be grouped as follows:

a. Edge coverage: an information bit received each time does not exceed 50 bits, a modulation order is 0, and a Polar coding scheme is used: a subframe 0 to a subframe 3.

b. Medium coverage: an information bit received each time does not exceed 200 bits, a modulation order is 10, and a Turbo coding scheme is used: a subframe 4 to a subframe 6.

c. Central coverage: an information bit received each time does not exceed 400 bits, a modulation order is 15, and a CC coding scheme is used: a subframe 7 to a subframe 10.

Optionally, before the receiving, by the base station on a transmission resource in a target resource group, data sent by the UE, the method further includes:

classifying, by the base station, available transmission resources into the plurality of transmission resource groups, where the plurality of transmission resource groups correspond to different transmission resources, and the plurality of transmission resource groups include the target resource group; and sending, by the base station, the information about the plurality of transmission resource groups to the UE, so that the UE determines the target resource group from the plurality of transmission resource groups.

Optionally, the sending, by the base station, the information about the plurality of transmission resource groups to the UE includes:

broadcasting, by the base station, the information about the plurality of transmission resource groups in a broadcast message.

If the base station directly sends the information about the plurality of transmission resource groups to the UE, the UE directly receives the information about the plurality of transmission resource groups. If the base station broadcasts the information about the plurality of transmission resource groups in the broadcast message, the UE needs to read the broadcast message and obtain the information about the plurality of transmission resource groups from the broadcast message.

Optionally, if the target resource group is a corresponding transmission resource group when the coverage situation of the UE in the cell is edge coverage, the method further includes:

receiving, by the base station, the data sent by the UE in a plurality of bundled transmission time intervals TTIs, where a start TTI for sending the data is the same as a start TTI for sending data in the plurality of bundled TTIs by other UE that separately uses another transmission resource in the target resource group.

Optionally, the method further includes:

performing, by the base station, hybrid automatic repeat request HARQ combination processing on received data that is sent by the UE in each of the plurality of bundled TTIs.

Optionally, the plurality of bundled TTIs include consecutive TTIs or inconsecutive TTIs.

It should be understood that the method for transmitting the data in the TTI bundling manner in this scheduling-free case may also be independently performed. To be specific, the base station may not configure the appropriate transmission format for the user equipment, for example, the base station may process the data by using a fixed transmission format. When learning that the coverage situation of the user equipment is the edge coverage, the user equipment may directly send the data to the base station in a same start TTI as other user equipment of the edge coverage in the TTI bundling manner on the transmission resource that is randomly selected and contended for. The base station performs HARQ combination processing on the data received in the bundled TTIs.

In another embodiment, if the location of the UE in the cell is constantly moving, the coverage situation of the UE in the cell is constantly changing. In this case, the base station may periodically determine, based on the information about the plurality of transmission resource groups and the coverage situation of the UE in the cell, the target resource group corresponding to the coverage situation of the UE from the plurality of transmission resource groups, so as to instruct the UE to use the transmission resource in the target resource group to send uplink data. Because the UE is constantly moving, and the coverage situation of the UE is constantly changing, target resource groups determined in different time periods may be different.

According to a third aspect, user equipment is provided. The user equipment is configured to perform the method in the first aspect or any possible implementation of the first aspect, and the user equipment is applied to a scheduling-free scenario of a base station for the user equipment. Specifically, the user equipment includes:

a determining module, configured to determine a target resource group from a plurality of transmission resource groups; and a sending module, configured to send data to the base station by using a transmission resource in the target resource group determined by the determining module, so that the base station performs data processing on the data by using a transmission format corresponding to the target resource group.

According to a fourth aspect, a base station is provided. The base station is configured to perform the method in the second aspect or any possible implementation of the second aspect, and the base station is applied to a scheduling-free scenario of the base station for user equipment UE. Specifically, the base station includes:

a receiving module, configured to receive, on a transmission resource in a target resource group, data sent by the UE; and a processing module, configured to perform data processing on the data by using a transmission format corresponding to the target resource group.

According to a fifth aspect, user equipment is provided, including a processor, a memory, a bus system, a receiver, and a transmitter. The transmitter and the receiver are respectively configured to send and receive information in a communication process. The memory is configured to store an instruction. The processor is configured to execute the instruction stored in the memory. The instruction stored in the memory is executed, so that the processor performs the method in the first aspect or any possible implementation of the first aspect. Specifically, the processor is specifically configured to:

determine a target resource group from a plurality of transmission resource groups.

The transmitter is configured to send data to the base station by using a transmission resource in the target resource group determined by the determining module, so that the base station performs data processing on the data by using a transmission format corresponding to the target resource group.

According to a sixth aspect, a base station is provided, including a processor, a memory, a bus system, a receiver, and a transmitter. The transmitter and the receiver are respectively configured to send and receive information in a communication process. The memory is configured to store an instruction. The processor is configured to execute the instruction stored in the memory. The instruction stored in the memory is executed, so that the processor performs the method in the second aspect or any possible implementation of the second aspect. Specifically, the receiver is specifically configured to:

receive, on a transmission resource in a target resource group, data sent by the UE.

The processor is configured to perform data processing on the data by using a transmission format corresponding to the target resource group.

According to a seventh aspect, a computer-readable medium is provided. The computer-readable medium is configured to store a computer program. The computer program includes an instruction for performing the method in the first aspect or any possible implementation of the first aspect.

According to an eighth aspect, a computer-readable medium is provided. The computer-readable medium is configured to store a computer program. The computer program includes an instruction for performing the method in the second aspect or any possible implementation of the second aspect.

Based on the foregoing technical solutions, according to the data transmission method in the embodiments of the present application, the user equipment selects the target resource group from the plurality of transmission resource groups to send the data to the base station, and the base station determines the target resource group of the transmission resource used when the user equipment sends the data, so as to flexibly select the appropriate transmission format to process the data sent by the user equipment in the scheduling-free transmission process, and improve data receiving and processing performance of the base station.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may derive other drawings from these accompanying drawings without creative efforts.

DETAILED DESCRIPTION

The following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be understood that, the technical solutions of the embodiments of the present application may be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system or the like. In the embodiments of the present application, an LTE communications system is used as an example for description.

It should be further understood that in the embodiments of the present application, user equipment (UE) may be referred to as a terminal, a mobile station (MS), a mobile terminal, and the like. The user equipment may communicate with one or more core networks by using a radio access network (RAN). For example, the user equipment may be a mobile phone (also referred to as a "cellular" phone) or a computer having a mobile terminal. For example, the user equipment may also be a portable, pocket-sized, handheld, computer built-in, or in-vehicle mobile apparatus, which exchanges voice and/or data with the radio access network.

In the embodiments of the present application, a base station may be a base transceiver station (BTS) in a GSM or CDMA system, or may be a NodeB (NB) in WCDMA, or may be an evolved NodeB (eNB or eNodeB) in LTE or another network-side device, and this is not limited in the present application. However, for ease of description, the following embodiments are described by using an eNodeB as an example.

Figure 1:
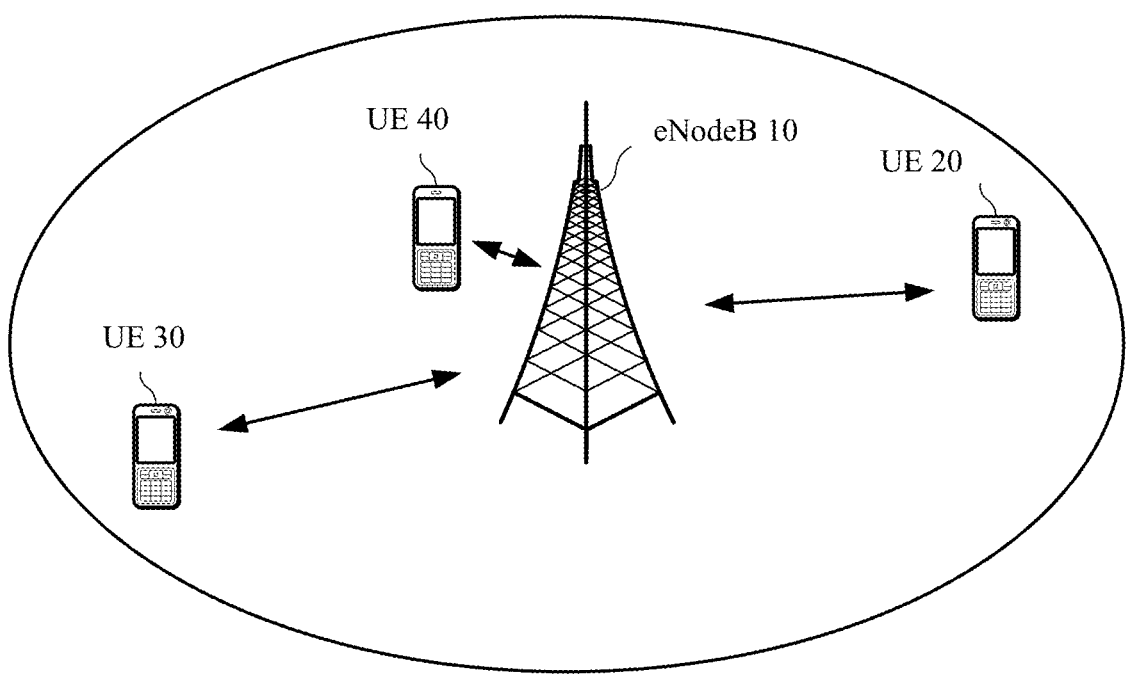
FIG. 1 shows a communications system used in an embodiment of the present application.

FIG. 1 shows a communications system used in an embodiment of the present application. The wireless communications system may include at least one base station. The base station may provide communication coverage for a specific geographic area, and may communicate with a terminal device in the coverage area (a cell). The wireless communications system 100 further includes a plurality of user equipments located in a coverage area of the base station. The user equipment may be mobile or fixed. FIG. 1 shows an example of one base station and three terminal devices. FIG. 1 shows an eNodeB 10, and UE 20, UE 30, and UE 40 that communicate with the eNodeB 10. The UE 20 and the UE 30 are located in an edge area of a coverage area (a cell) of the eNodeB 10, and the UE 40 is located in a central area of the coverage area (the cell) of the eNodeB 10.

It should be understood that the communications system may further include a plurality of base stations and a coverage area of each base station may include another quantity of user equipment. This is not limited in this embodiment of the present application.

Figure 2:
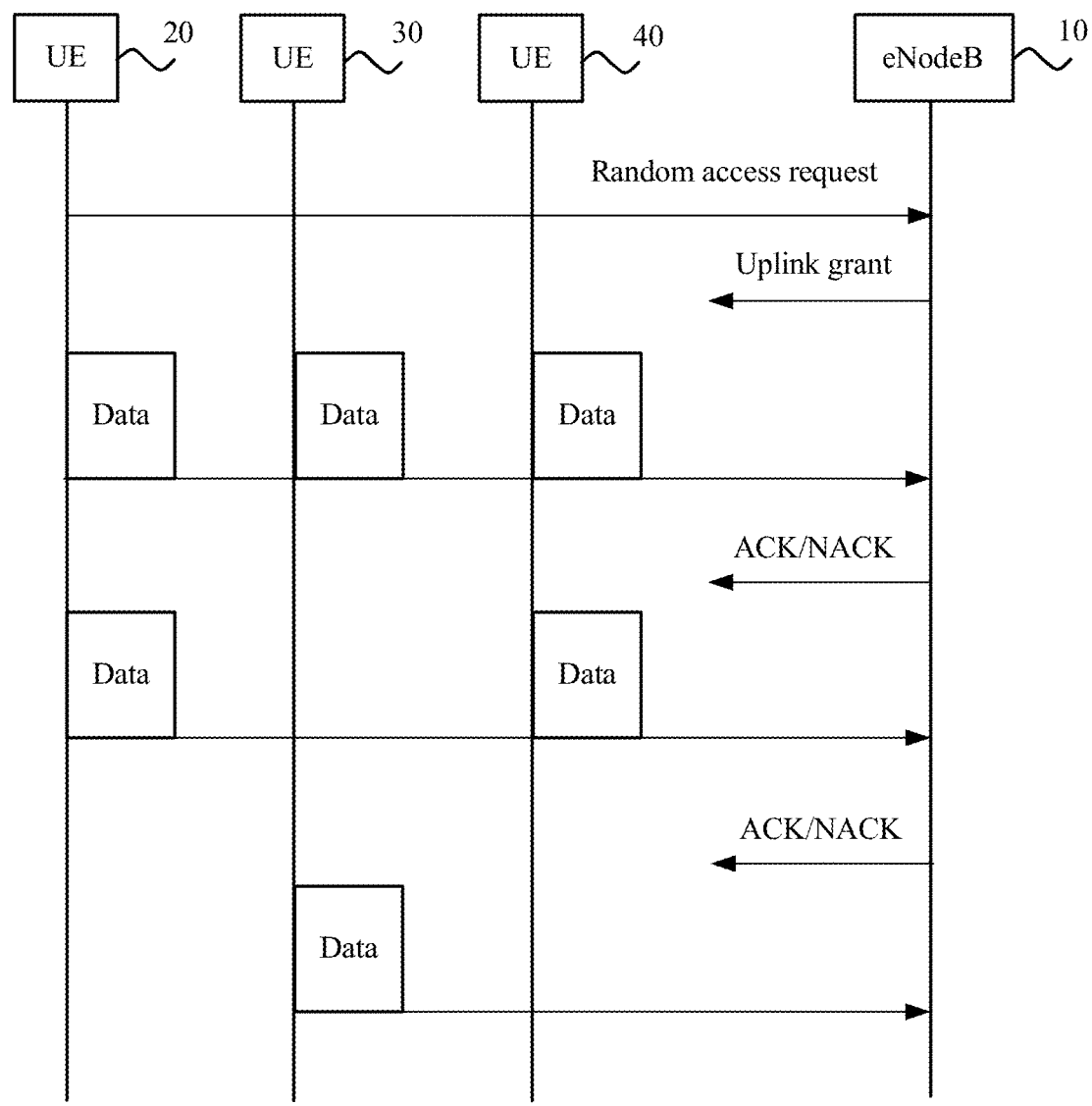
FIG. 2 shows an uplink transmission process based on a scheduling-free transmission scheme according to an embodiment of the present application.

FIG. 2 shows an uplink transmission process based on a scheduling-free transmission scheme according to an embodiment of the present application. As shown in FIG. 2, a basic network architecture of a massive connectivity communications system according to this embodiment of the present application may include an eNodeB 10 and at least one wireless terminal, for example, user equipment such as UE 20, UE 30, and UE 40. As shown in FIG. 2, an eNodeB 10 is configured to: provide a communication service for at least one of the user equipment such as the UE 20, the UE 30, and the UE 40, and access a core network. Herein, wireless communication between the eNodeB 10 and the UE 20, the UE 30, and the UE 40 is used as an example for description.

The UE 20, the UE 30, and the UE 40 initially use a random access channel (RACH) for access. After a conventional Radio Resource Control (RRC) signaling connection is established, the UE 20, the UE 30, and the UE 40 may send data on a physical uplink shared channel (PUSCH) as required. Different from a conventional transmission manner based on base station scheduling, the UE 20, UE 30, and UE 40 do not need to obtain a scheduling instruction of the eNodeB 10 in advance before sending the data on the PUSCH, but may directly send the data, and then detect, in a preset time window, an acknowledgement (ACK) message or a negative acknowledgement (NACK) message delivered by the eNodeB. If an eNodeB 10 detection error is found, the user equipment initiates retransmission. A maximum advantage of using a scheduling-free transmission mechanism is that scheduling overheads may be saved, and a waiting time for data transmission of a user may be reduced.

However, in the current scheduling-free transmission scheme, because the eNodeB 10 cannot adaptively use, based on a coverage level of the user equipment, a transmission format that matches the user equipment, for example, a modulation and coding scheme and a transmission code block size, the eNodeB cannot flexibly process, for a coverage situation of the user equipment, data sent by the user equipment, and receiving performance of a system is relatively poor.

In addition, because a conventional transmission time interval (TTI) bundling transmission manner is based on eNodeB 10 scheduling, a receive end of the eNodeB 10 may be prescient by scheduling. However, in a scheduling-free scenario, the receive end of the eNodeB 10 cannot obtain the foregoing information. If it is implemented based on a full traversal scenario, complexity of a receiver sharply increases. Therefore, the full traversal scenario is usually not used.

In addition, in the scheduling-free transmission scheme, a physical layer can distinguish the user equipment (UE) of a current transmission time interval (TTI) by using only a pilot or a preamble sequence, but cannot fully identify an identity of the user equipment, and an identifier (ID) of the user equipment is usually carried in a data packet header and can be parsed only by a data link layer. Therefore, the physical layer cannot maintain historical data of the user equipment. For a data packet with a demodulation error, both the physical layer and the data link layer cannot confirm a user equipment ID of the data packet. Therefore, a conventional hybrid automatic repeat request (HARQ) combination and receiving technology is difficult to use in the foregoing scenario. This directly affects receiving performance of the user equipment at a low coverage level.

In this application scenario, an embodiment of the present application provides a data transmission method. A base station configures an appropriate transmission format for user equipment based on a transmission resource group of a transmission resource used when the user equipment sends data, for example, a modulation and coding scheme and a transmission code block size, and then processes, by using a specific transmission format, the data sent by the user equipment, so as to resolve a problem that the base station cannot flexibly process, for a coverage situation of the user equipment, the data sent by the user equipment in a scheduling-free transmission process.

In addition, in the data transmission method in this embodiment of the present application, a data sending time of the user equipment in a TTI bundling manner is limited to ensure that user data in a bundled TTI is unique, so as to resolve a problem that in a scheduling-free transmission process, a TTI bundling manner cannot be used to transmit the data and a HARQ combination technology cannot be used.

Figure 3:
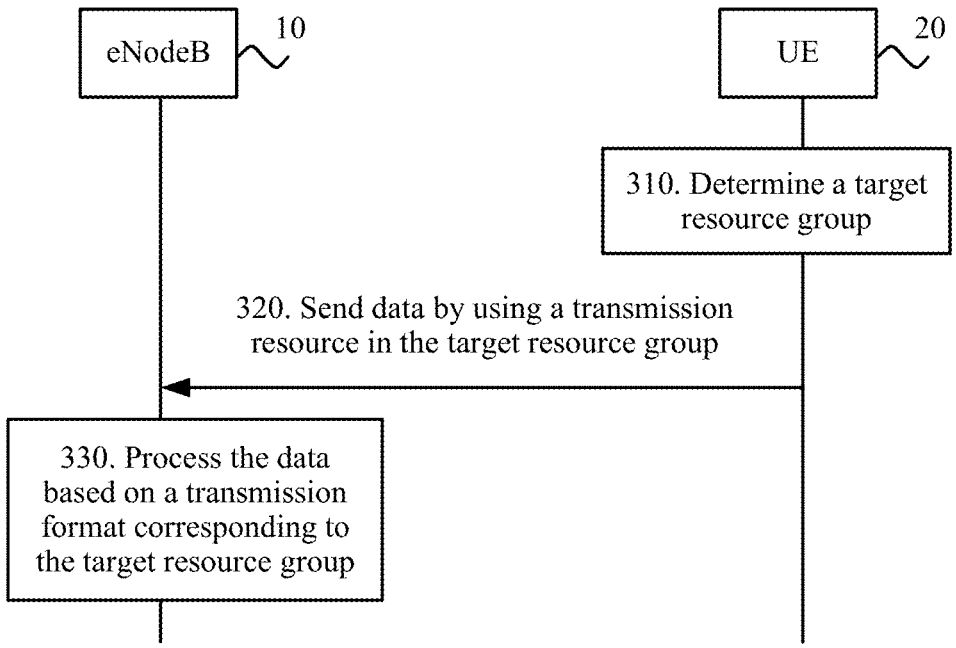
FIG. 3 is an interactive flowchart of a data transmission method according to an embodiment of the present application.

FIG. 3 is an interactive flowchart of a data transmission method according to an embodiment of the present application. Herein, an eNodeB 10 and UE 20 are used as an example for description. The data transmission method is applied to a scheduling-free scenario of the eNodeB 10 for the UE 20. As shown in FIG. 3, the data transmission procedure specifically includes the following steps.

310. UE 20 determines a target resource group.

Specifically, available transmission resources may be classified into a plurality of transmission resource groups, the plurality of transmission resource groups correspond to different transmission resources, and the plurality of transmission resource groups include the target resource group. The UE 20 may select, from the plurality of transmission resource groups based on a condition of the UE 20, the target resource group that matches the UE 20, and select or contend for a transmission resource from transmission resources of the target resource group.

Optionally, the UE 20 may determine a target transmission resource based on a coverage situation of the UE 20 in a cell. The coverage situation is related to a location of the UE 20 in the cell, and the location of the UE 20 in the cell is related to a channel transmission condition of the UE 20. For example, the coverage situation may include edge coverage, central coverage, medium coverage, and the like. When the UE 20 is user equipment of the edge coverage, channel quality and transmitted signal quality of the UE 20 are relatively poor, and a signal transmission power is relatively low. When the UE 20 is in the central coverage, channel quality and transmitted signal quality of the UE 20 are relatively good, and a signal transmission power is relatively high.

320. The UE 20 sends data to the eNodeB by using a transmission resource in the target resource group.

After determining the target resource group from the plurality of transmission resource groups, the UE 20 may select or contend for the transmission resource from the transmission resources in the target resource group, so as to send the data to the eNodeB 10 by using the transmission resource.

330. The eNodeB 10 performs data processing on the data by using a transmission format corresponding to the target resource group.

After receiving the data sent by the UE 20 on the transmission resource in the target resource group, the eNodeB 10 may process, by using the transmission format corresponding to the target resource group, the data sent by the UE 20. Different transmission resource groups correspond to different data processing manners, and data processing manners used by the eNodeB for data received on different transmission resources are different.

For example, the eNodeB 10 may process, by using a modulation and coding scheme corresponding to a transmission resource group and based on the transmission resource group of the transmission resource used by the UE 20, the data sent by the UE 20. For example, if the coverage situation of the UE 20 is central coverage, the data sent by the UE 20 is processed by using a higher-order high-code rate modulation and demodulation scheme, for example, a modulation order used when the data is modulated is 15. If the coverage situation of the UE 20 is edge coverage, the data sent by the UE 20 is processed by using a lower-order low-code rate modulation and demodulation scheme, for example, a modulation order used when the data is modulated is 0. If the coverage situation of the UE 20 is medium coverage, the data sent by the UE 20 is processed by using a modulation and demodulation scheme with a moderate order and code rate, for example, a modulation order used when the data is modulated is 10.

For another example, the eNodeB 10 may further process, by using a transmission code block size corresponding to the transmission resource group and based on the transmission resource group of the transmission resource used by the UE 20, the data sent by the UE 20. For example, if the coverage situation of the UE 20 is central coverage, the data sent by the UE 20 may be demodulated by using a relatively large code block, for example, a maximum quantity of information receiving bits used when the data is demodulated is 400 bits. If the coverage situation of the UE 20 is edge coverage, the data sent by the UE 20 is demodulated by using a relatively small code block, for example, a maximum quantity of information receiving bits used when the data is demodulated is 50 bits. If the coverage situation of the UE 20 is medium coverage, the data sent by the UE 20 is demodulated by using a moderately sized code block, for example, a maximum quantity of information receiving bits used when the data is demodulated is 200 bits.

Therefore, the UE 20 sends the data on a specific transmission resource, so that the eNodeB 10 can select the transmission format that matches the UE 20, to process the data sent by the UE 20.

It should be understood that determining the target resource group corresponding to the UE 20 from the plurality of transmission resource groups may be that the UE 20 determines the target resource group, or may be that the eNodeB 10 instructs, after determining the target resource group from the plurality of transmission resource groups, the UE 20 to send the data on the transmission resource in the target resource group.

Therefore, in this embodiment of the present application, the user equipment sends the data to the eNodeB by selecting the transmission resource in the target transmission resource group from the plurality of transmission resource groups in a scheduling-free transmission process, so that the eNodeB can flexibly configure, based on the transmission resource group of the transmission resource used when the user equipment sends the data, an appropriate transmission format for the user equipment for the coverage situation of the user equipment, to process the data sent by the user equipment.

Figure 4:
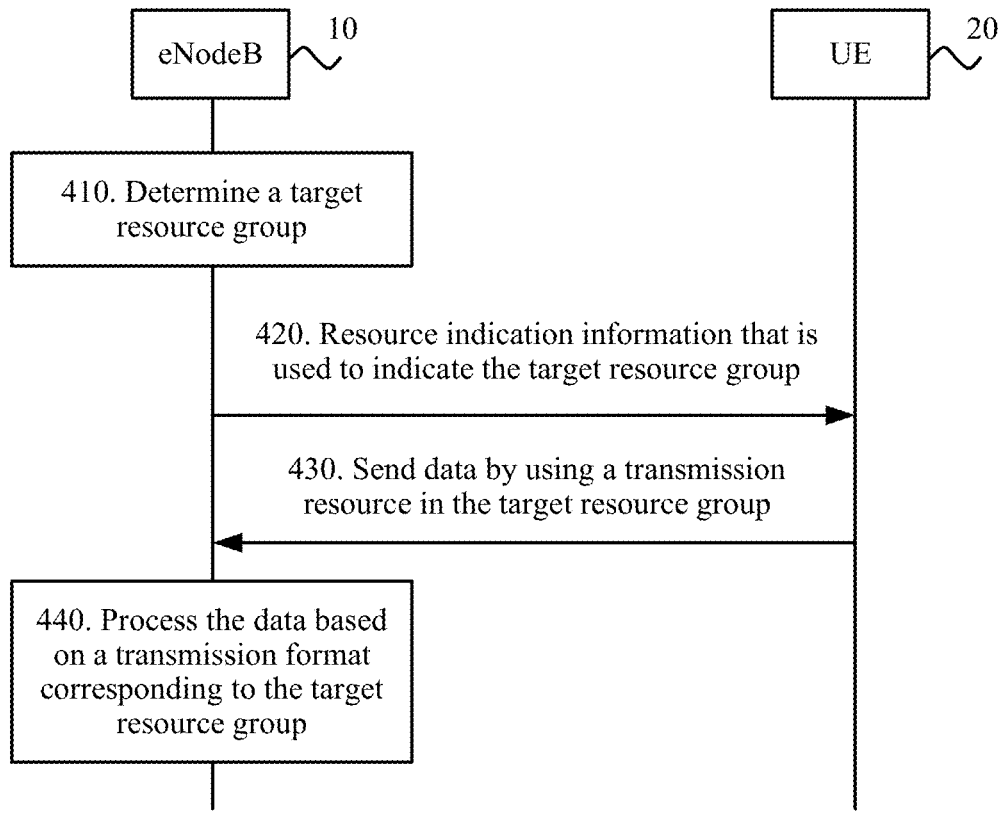
FIG. 4 is an interactive flowchart of a data transmission method according to another embodiment of the present application.

FIG. 4 is an interactive flowchart of a data transmission method according to another embodiment of the present application. The data transmission method is applied to a scheduling-free scenario of an eNodeB 10 for UE 20. As shown in FIG. 4, the data transmission procedure specifically includes the following steps.

410. An eNodeB 10 determines a target resource group.

Specifically, available transmission resources may be classified into a plurality of transmission resource groups, the plurality of transmission resource groups correspond to different transmission resources, and the plurality of transmission resource groups include the target resource group. The eNodeB 10 may select, from the plurality of transmission resource groups based on a condition of the UE 20, the target resource group that matches the UE 20, so that the UE 20 selects or contends for a transmission resource from transmission resources of the target resource group.

Optionally, the eNodeB 10 may determine a target transmission resource based on a coverage situation of the UE 20 in a cell. The coverage situation is related to a location of the UE 20 in the cell, and the location of the UE 20 in the cell is related to a channel transmission condition of the UE 20. For example, the coverage situation may include edge coverage, central coverage, medium coverage, and the like.

420. The eNodeB 10 sends, to UE 20, resource indication information that is used to indicate the target resource group.

After selecting the target resource group that matches the UE 20 for the UE 20 from the plurality of transmission resource groups, the eNodeB 10 may send, to the UE 20, the resource indication information that is used to indicate the target resource group. The UE 20 selects or contends for the transmission resource from the transmission resources in the target resource group based on the resource indication information, so as to send data to the eNodeB 10 by using the transmission resource.

430. The UE 20 sends data to the eNodeB by using a transmission resource in the target resource group.

After receiving the resource indication information, the UE 20 can select or contend for the transmission resource from the target resource group indicated by the resource indication information, and send uplink data to the eNodeB by using the resource in the target transmission resource group.

440. The eNodeB 10 performs data processing on the data by using a transmission format corresponding to the target resource group.

After receiving the data sent by the UE 20 on the transmission resource in the target resource group, the eNodeB 10 may process, by using the transmission format corresponding to the target resource group, the data sent by the UE 20. The target resource group is determined based on the condition of the UE 20. Therefore, the transmission format that is corresponding to the target group and that is used by the eNodeB matches the UE 20, and the eNodeB receives and processes, by using the transmission format corresponding to the target resource group, the data sent by the UE 20, so as to obtain relatively good receiving and processing results and improve receiving performance of the eNodeB in the scheduling-free transmission process.

Therefore, in this embodiment of the present application, the eNodeB configures, based on the target transmission resource group of the transmission resource used when the user equipment sends the data, an appropriate transmission format for the user equipment, to process the data sent by the user equipment, so that the eNodeB can flexibly process, for the coverage situation of the user equipment in the scheduling-free transmission process, the data sent by the user equipment.

Optionally, the transmission resource includes at least one of a preamble sequence, a pilot resource, a time domain resource, a frequency resource, a code word resource, and a beam resource.

Optionally, the transmission format includes at least one of a transmission code block size, a data modulation order, and a data encoding scheme.

Figure 5:
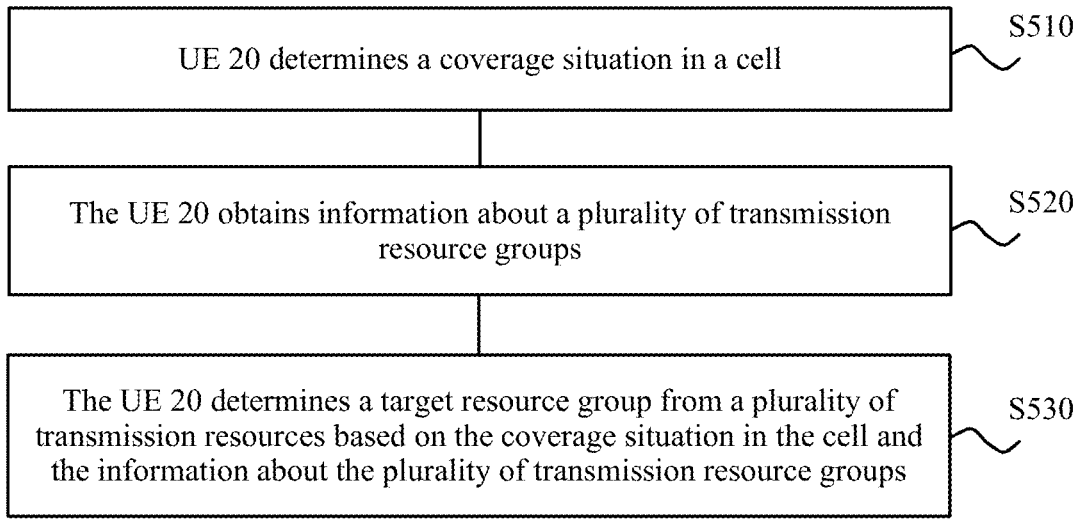
FIG. 5 is a flowchart of determining a target resource group by user equipment according to an embodiment of the present application.
Figure 6:
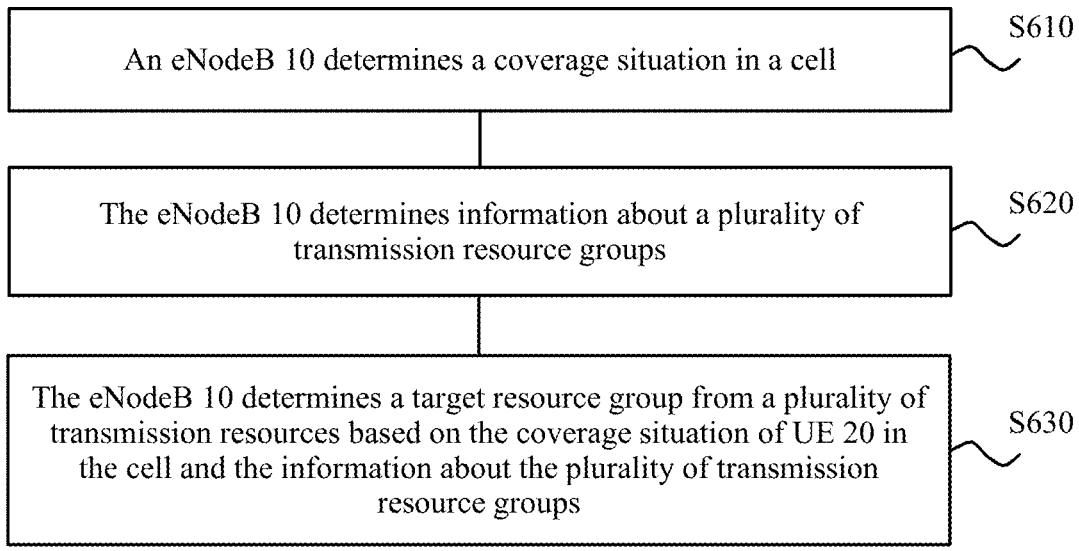
FIG. 6 is a flowchart of determining a target resource group by an eNodeB according to an embodiment of the present application.

With reference to FIG. 5 and FIG. 6, the following separately describes in detail how UE 20 and an eNodeB 10 determine a target resource group from a plurality of transmission resource groups. FIG. 5 is a flowchart of determining a target resource group by user equipment according to an embodiment of the present application. As shown in FIG. 5, a process of determining the target resource group by the UE 20 includes the following steps.

S510. UE 20 determines a coverage situation in a cell.

The coverage situation of the UE 20 is related to a location of the UE 20 in the cell, and the location of the UE 20 in the cell is related to a channel transmission condition of the UE 20. For example, the coverage situation may include edge coverage, central coverage, medium coverage, and the like. When the UE 20 is user equipment of the edge coverage, channel quality and transmitted signal quality of the UE 20 are relatively poor, and a signal transmission power is relatively low. When the UE 20 is in the central coverage, channel quality and transmitted signal quality of the UE 20 are relatively good, and a signal transmission power is relatively high.

In this embodiment of the present application, a manner of grouping resources based on the coverage situation of the UE is added. Specifically, for user equipment in different communication environments, manners in which the eNodeB 10 processes a data packet sent by the user equipment may be entirely different. For example, for the user equipment at a center of the cell, a radio channel condition is relatively good, and the eNodeB 10 may complete data transmission and processing by using a large transmission code block, a higher-order modulation scheme, and the like. For the user equipment located on a cell edge or in a basement, radio channel quality is relatively poor, and the eNodeB 10 may complete data transmission and processing in a data transmission process by using a small code block, a lower-order modulation scheme, and the like.

To ensure good performance when a system receives data, user equipment of different channel conditions needs to be distinguished. Therefore, a concept of the coverage situation of the user equipment in the cell is introduced. A channel transmission condition of the user equipment having a same coverage situation is similar, and the eNodeB 10 may use a similar data processing manner for such user equipment. Therefore, a coverage situation corresponds to a specific channel condition or signal condition. For example, in an IoT system, the coverage situation of the user equipment may be classified into three types: the coverage situation of the user equipment that is closer to the eNodeB is "central coverage"; the coverage situation of the user equipment that is farther from the eNodeB is "medium coverage"; and the coverage situation of the user equipment in a scenario such as the cell edge or the basement is "edge coverage". The eNodeB may select a matched transmission format for the user equipment based on the coverage situation of the user equipment, so as to improve data receiving performance of a receiver.

Optionally, that UE 20 determines a coverage situation of the UE 20 in a cell may be that the UE 20 determines the coverage situation of the UE 20 in the cell based on a power of a last received downlink reference signal that is sent by the eNodeB 10.

Optionally, that UE 20 determines a coverage situation of the UE 20 in a cell may also be that the UE 20 receives coverage indication information that is used to indicate the coverage situation of the UE 20 and that is sent by the eNodeB 10, so as to obtain the coverage situation of the UE 20. The eNodeB 10 may determine the coverage situation of the UE 20 in the cell based on a power of a last received uplink reference signal that is sent by the UE 20.

Optionally, the downlink reference signal may be a downlink pilot reference signal, and the uplink reference signal may be an uplink pilot reference signal.

In this embodiment, the coverage situation of the UE 20 in the cell may be determined by the eNodeB 10 based on the power of the received uplink reference signal sent by the UE 20, and then, the indication information that is used to indicate the coverage situation of the UE 20 in the cell is sent to the UE 20 for notifying the UE 20; or the UE 20 may obtain the coverage situation of the UE 20 in the cell by measuring the power of the downlink reference signal sent by the eNodeB 10. For example, the UE 20 may measure a synchronization signal of the cell, including a primary synchronization signal (PSS), a secondary synchronization signal (SSS), a physical broadcast channel (PBCH), a cell-specific reference signal (CRS), and the like. The UE 20 may obtain the current coverage situation of the UE 20 in the cell through the measurement, and select the target resource group corresponding to the coverage situation of the UE 20 from a plurality of transmission resource groups. This is not limited in this embodiment of the present application.

S520. The UE 20 obtains information about a plurality of transmission resource groups.

Optionally, the eNodeB 10 may classify available transmission resources into the plurality of transmission resource groups, where the plurality of transmission resource groups correspond to different transmission resources, and send information about the plurality of transmission resource groups to the UE 20.

For example, a preamble sequence is used as an example, and available preamble sequences may be classified into a plurality of preamble sequence groups herein, for example, three groups. Each preamble sequence resource group corresponds to one coverage situation of the user equipment, and each preamble sequence resource group has a transmission format corresponding to the preamble sequence resource group. For the user equipment having different coverage situations, the eNodeB 10 uses different transmission formats when processing the data sent by the user equipment, for example, uses different code block sizes when receiving the data. To be specific, a maximum quantity of bits of an information bit received each time is different, or a modulation order used when data modulation is performed is different.

For example, if the cell has 251 available transmission resources (corresponding to 251 preamble sequences numbered from 0 to 250) in total, the available transmission resources may be grouped as follows:

a. Edge coverage: the information bit received each time does not exceed 50 bits, the modulation order is 0, and a Polar coding scheme is used: sequences 0 to 60 and 211 to 250.

b. Medium coverage: the information bit received each time does not exceed 200 bits, the modulation order is 10, and a Turbo coding scheme is used: sequences 61 to 150.

c. Central coverage: the information bit received each time does not exceed 400 bits, the modulation order is 15, and a CC coding scheme is used: sequences 151 to 210.

For another example, a pilot resource is used as an example. The eNodeB 10 classifies available pilot resources into a plurality of pilot resource groups, for example, three groups herein. Each pilot resource group corresponds to one coverage situation of the user equipment, and each pilot resource group has a transmission format corresponding to the pilot resource group. For the user equipment having different coverage situations, the eNodeB 10 uses different transmission formats when processing the data sent by the user equipment, for example, uses different code block sizes when receiving the data. To be specific, a maximum quantity of bits of an information bit received each time is different, or a modulation order used when modulation is performed is different.

For example, if the cell has 6 available transmission resources (corresponding to 6 pilots numbered from 0 to 5) in total, the available transmission resources may be grouped as follows:

a. Edge coverage: the information bit received each time does not exceed 50 bits, the modulation order is 0, and a Polar coding scheme is used: sequences 0 and 5.

b. Medium coverage: the information bit received each time does not exceed 200 bits, the modulation order is 10, and a Turbo coding scheme is used: sequences 1 and 2.

c. Central coverage: the information bit received each time does not exceed 400 bits, the modulation order is 15, and a CC coding scheme is used: sequences 3 and 4.

The coverage situation of the user equipment herein includes the edge coverage, the medium coverage, and the central coverage. Transmission formats corresponding to different coverage situations include a transmission code block size and a data modulation scheme, a transmission code block is a maximum value of information bits transmitted each time, and the data modulation scheme includes a modulation scheme having different modulation orders.

It should be understood that, the grouping of the transmission resources herein may be grouping of logical transmission resources, for example, grouping of pilot resources or preamble sequences. For example, different pilot resources are classified into different transmission resource groups and therefore correspond to different coverage situations of the user equipment. However, the user equipment that uses different pilot resources may occupy a same time-frequency resource. Alternatively, the grouping of the transmission resources may be grouping of different frequency domain resources, time domain resources, or code domain resources. For example, different frequency domain resources are classified into different transmission resource groups and therefore correspond to different coverage situations. In this way, the user equipment may use a same pilot resource or preamble sequence, and distinguish the coverage situation of the user equipment by using different frequency bands. This is not limited in the present application.

It should be further understood that, the eNodeB 10 may determine the information about the plurality of transmission resource groups and send the information about the plurality of transmission resource groups to the UE 20 so that the UE 20 selects the target resource group from the plurality of transmission resource groups. Alternatively, the UE 20 may autonomously select the target resource group from the plurality of transmission resource groups that are agreed in advance, for example, from a plurality of pre-classified transmission resource groups specified in a protocol.

After classifying the available transmission resources into the plurality of transmission resource groups, the eNodeB 10 may send the information about the plurality of transmission resource groups to the UE 20. It should be understood that the eNodeB 10 may send the information about the plurality of transmission resource groups to one user equipment, or may send the information about the plurality of transmission resource groups to a plurality of user equipments.

Optionally, that the eNodeB 10 sends the information about the plurality of transmission resource groups to the UE 20 includes:

broadcasting, by the eNodeB 10, the information about the plurality of transmission resource groups in a broadcast message.

Specifically, the eNodeB 10 sends the information about the plurality of transmission resource groups to the UE 20 in a broadcast manner. In this way, the user equipment in a coverage area of the eNodeB 10 may obtain the information about the plurality of transmission resource groups.

S530. The UE 20 determines a target resource group from a plurality of transmission resources based on the coverage situation in the cell and the information about the plurality of transmission resource groups.

Specifically, after receiving the information about the plurality of transmission resource groups sent by the eNodeB 10 or obtaining the information about the plurality of transmission resource groups specified in the protocol, the UE 20 determines, based on the coverage situation of the UE 20 in the cell, the target resource group corresponding to the coverage situation of the UE 20 from the plurality of transmission resource groups.

If the eNodeB 10 directly sends the information about the plurality of transmission resource groups to the UE 20, the UE 20 directly receives the information about the plurality of transmission resource groups. If the eNodeB 10 broadcasts the information about the plurality of transmission resource groups in the broadcast message, the UE 20 needs to read the broadcast message and obtain the information about the plurality of transmission resource groups from the broadcast message.

After receiving the information about the plurality of transmission source groups, the UE 20 may determine the target resource group from the plurality of transmission resource groups based on the coverage situation of the UE 20 in the cell and the information about the plurality of transmission resource groups. For example, if the coverage situation of the UE 20 in the cell is edge coverage, the coverage situation of the user equipment corresponding to the target resource group determined by the UE 20 is edge coverage in the cell. If the coverage situation of the UE 20 in the cell is medium coverage, the coverage situation of the user equipment corresponding to the target resource group determined by the UE 20 is medium coverage in the cell. If the coverage situation of the UE 20 in the cell is central coverage, the coverage situation of the user equipment corresponding to the target resource group determined by the UE 20 is central coverage in the cell.

In another embodiment, if the location of the UE 20 in the cell is constantly moving, in other words, the coverage situation of the UE 20 in the cell is constantly changing, in this case, the UE 20 may periodically determine, based on the information about the plurality of transmission resource groups and the coverage situation of the UE 20 in the cell, the target resource group corresponding to the coverage situation of the UE 20 from the plurality of transmission resource groups, so as to send uplink data to the eNodeB by using a transmission resource in the target resource group. Because the UE 20 is constantly moving, and the coverage situation of the UE 20 is constantly changing, determined target resource groups may be different. For example, the UE 20 may repeatedly perform the process of determining the target transmission resource based on a specific cycle such as thirty (30) minutes.

Specifically, if the UE 20 is constantly moving, in other words, in a movement scenario, because the coverage situation of the user equipment 20 in the cell varies over time, the UE 20 needs to perform periodic determining and identification to determine the coverage situation of the UE 20, and determine the target resource group corresponding to the coverage situation of the UE 20. However, for a fixed scenario, the location of the user equipment is basically fixed. Therefore, one determining may be selected to make during initial access, so as to send the data to the eNodeB on a transmission resource in a determined fixed target resource group.

After determining the target resource group, the UE 20 may select or contend for the transmission resource from the target resource group to send the data to the eNodeB 10.

For example, if the eNodeB 10 groups a plurality of transmission resources obtained after the preamble sequences are grouped, and it is assumed that the coverage situation of the UE 20 in the cell is edge coverage, the UE 20 may randomly select a sequence from a group a, for example, select a sequence 50 as a current preamble sequence, to be specific, send, to the eNodeB 10, the data carrying the sequence 50.

If the eNodeB 10 groups a plurality of transmission resources obtained after the pilot resources are grouped, and it is assumed that the coverage situation of the UE 20 in the cell is edge coverage, the UE 20 may randomly select a sequence from a group a, for example, select a sequence 0 as a sequence of a current transmission pilot signal, to be specific, send, to the eNodeB 10, the data carrying the sequence 0.

In addition to sending the data on the transmission resource in the target resource group determined from the plurality of transmission resource groups, the UE 20 can further send, based on an indication of the eNodeB, the data on the transmission resource in the target resource group indicated by the eNodeB. In this case, the eNodeB 10 executes a task of determining the target resource group from the plurality of transmission resource groups, and notifies the UE 20 of the determined target resource group by using an indication message.

FIG. 6 is a flowchart of determining a target resource group by an eNodeB according to an embodiment of the present application. As shown in FIG. 6, a process of determining the target resource group by an eNodeB 10 includes the following steps.

S610. An eNodeB 10 determines a coverage situation of UE 20 in a cell.

The coverage situation of the UE 20 is related to a location of the UE 20 in the cell, and the location of the UE 20 in the cell is related to a channel transmission condition of the UE 20. For example, the coverage situation may include edge coverage, central coverage, medium coverage, and the like.

Optionally, that an eNodeB 10 determines a coverage situation of UE 20 in a cell may be that the eNodeB 10 determines the coverage situation of the UE 20 based on a power of a last received uplink reference signal that is sent by the UE 20.

Optionally, the eNodeB 10 may also receive coverage indication information that is used to indicate the coverage situation of the UE 20 and that is sent by the UE 20, so as to obtain the coverage situation of the UE 20 in the cell. The UE 20 may determine the coverage situation of the UE 20 in the cell based on a power of a last received downlink reference signal that is sent by the eNodeB 10.

Optionally, the downlink reference signal may be a downlink pilot reference signal, and the uplink reference signal may be an uplink pilot reference signal.

In this embodiment, the coverage situation of the UE 20 in the cell may be determined by the eNodeB 10 based on the power of the received uplink reference signal sent by the UE 20, for example, by measuring a power of the uplink pilot reference signal. Alternatively, the coverage situation of the UE 20 in the cell may be obtained after the UE 20 measures the power of the downlink reference signal sent by the eNodeB 10 and then sends, to the eNodeB 10 for notifying the eNodeB 10, the indication information that is used to indicate the coverage situation of the UE 20 in the cell. For example, the UE 20 may measure a pilot reference signal of downlink data. The UE 20 may obtain the current coverage situation of the UE 20 in the cell through the measurement, so as to notify the eNodeB 10 of the coverage situation of the UE 20. This is not limited in this embodiment of the present application.

S620. The eNodeB 10 obtains information about a plurality of transmission resource groups.

Optionally, the eNodeB 10 classifies available transmission resources into the plurality of transmission resource groups, where the plurality of transmission resource groups correspond to different transmission resources, and sends the information about the plurality of transmission resource groups to the UE 20.

For example, a frequency domain resource is used as an example. The eNodeB 10 may classify available frequency domain resources into a plurality of frequency domain resource groups, for example, three groups herein. Each frequency domain resource group corresponds to one coverage situation of the user equipment, and each frequency domain resource group has a transmission format corresponding to the frequency domain resource group. For the user equipment having different coverage situations, the eNodeB 10 uses different transmission formats when processing data sent by the user equipment, for example, uses different code block sizes when receiving the data. To be specific, a maximum quantity of bits of an information bit (bit) received each time is different, or a modulation order used when data modulation is performed is different.

For example, if a frequency band that can be used to perform uplink data transmission by the user equipment in the cell includes frequencies 1000 MHz to 2500 MHz, the frequencies may be grouped as follows:

a. Edge coverage: the information bit received each time does not exceed 50 bits, the modulation order is 0, and a Polar coding scheme is used: frequencies 1000 MHz to 1500 MHz.

b. Medium coverage: the information bit received each time does not exceed 200 bits, the modulation order is 10, and a Turbo coding scheme is used: frequencies 1500 MHz to 2000 MHz.

c. Central coverage: the information bit received each time does not exceed 400 bits, the modulation order is 15, and a CC coding scheme is used: frequencies 2000 MHz to 2500 MHz.

For another example, a time domain resource is used as an example. The eNodeB 10 classifies available time domain resources into a plurality of time domain resource groups, for example, three groups herein. Each time domain resource group corresponds to one coverage situation of the user equipment, and each time domain resource group has a transmission format corresponding to the time domain resource group. For the user equipment having different coverage situations, the eNodeB 10 uses different transmission formats when processing data sent by the user equipment, for example, uses different code block sizes when receiving the data. To be specific, a maximum quantity of bits of an information bit received each time is different, and a modulation order used when data modulation is performed is different.

For example, when the user equipment performs the uplink data transmission, the user equipment having different coverage situations may use different subframes to transmit the data, and the subframes may be grouped as follows:

a. Edge coverage: the information bit received each time does not exceed 50 bits, the modulation order is 0, and a Polar coding scheme is used: a subframe 0 to a subframe 3.

b. Medium coverage: the information bit received each time does not exceed 200 bits, the modulation order is 10, and a Turbo coding scheme is used: a subframe 4 to a subframe 6.

c. Central coverage: the information bit received each time does not exceed 400 bits, the modulation order is 15, and a CC coding scheme is used: a subframe 7 to a subframe 10.

The coverage situation of the user equipment herein includes the edge coverage, the medium coverage, and the central coverage. Transmission formats corresponding to different coverage situations include a transmission code block size and a data modulation scheme, a transmission code block is a maximum value of information bits transmitted each time, and the data modulation scheme includes a modulation scheme having different modulation orders.

After classifying the available transmission resources into the plurality of transmission resource groups, the eNodeB 10 sends the information about the plurality of transmission resource groups to the UE 20. It should be understood that the eNodeB 10 may send the information about the plurality of transmission resource groups to one user equipment, or may send the information about the plurality of transmission resource groups to a plurality of user equipments.

It should be understood that the eNodeB 10 may autonomously classify the available transmission resources into the plurality of transmission resource groups, or may directly obtain the information about the plurality of transmission resource groups that are agreed in advance, for example, information about a plurality of pre-classified transmission resource groups specified in a protocol.

Optionally, that the eNodeB 10 sends the information about the plurality of transmission resource groups to the UE 20 includes:

broadcasting, by the eNodeB 10, the information about the plurality of transmission resource groups in a broadcast message.

Specifically, the eNodeB 10 sends the information about the plurality of transmission resource groups to the UE 20 in a broadcast manner. In this way, the user equipment in a coverage area of the eNodeB 10 may obtain the information about the plurality of transmission resource groups.

S630. The eNodeB 10 determines a target resource group from a plurality of transmission resources based on the coverage situation of the UE 20 in the cell and the information about the plurality of transmission resource groups.

Specifically, after the eNodeB 10 obtains the information about the plurality of transmission resource groups specified in the protocol or the eNodeB 10 groups the available transmission resources, the eNodeB 10 may determine the target resource group for the UE 20 from the plurality of transmission resource groups based on the coverage situation of the UE 20 in the cell and the information about the plurality of transmission resource groups.

For example, if the coverage situation of the UE 20 in the cell is edge coverage, in this case, the coverage situation of the user equipment corresponding to the target resource group determined by the eNodeB 10 for the UE 20 is edge coverage in the cell. If the coverage situation of the UE 20 in the cell is medium coverage, in this case, the coverage situation of the user equipment corresponding to the target resource group determined by the eNodeB 10 for the UE 20 is medium coverage in the cell. If the coverage situation of the UE 20 in the cell is central coverage, in this case, the coverage situation of the user equipment corresponding to the target resource group determined by the eNodeB 10 for the UE 20 is central coverage in the cell.

In another embodiment, if the location of the UE 20 in the cell is constantly moving, in other words, the coverage situation of the UE 20 in the cell is constantly changing, in this case, the eNodeB 10 may periodically determine, based on the information about the plurality of transmission resource groups and the coverage situation of the UE 20 in the cell, the target resource group corresponding to the coverage situation of the UE 20 from the plurality of transmission resource groups, so as to instruct the UE 20 to use a transmission resource in the target resource group to send uplink data. Because the UE 20 is constantly moving, and the coverage situation of the UE 20 is constantly changing, determined target resource groups may be different. For example, the eNodeB 10 may repeatedly perform the process of determining the target transmission resource based on a specific cycle such as thirty (30) minutes.

After the eNodeB 10 determines the target resource group, the UE 20 may select or contend for the transmission resource from the target resource group to send the data to the eNodeB 10.

For example, if the eNodeB 10 groups a plurality of transmission resources obtained after the frequency domain resources are grouped, and it is assumed that the coverage situation of the UE 20 in the cell is edge coverage, the eNodeB 10 may instruct the UE 20 to randomly select a frequency resource from a group a, for example, 1000 MHz to 1200 MHz as a frequency domain resource used by currently transmitted data. To be specific, the UE 20 sends the data to the eNodeB 10 on the frequency domain resource of 1000 MHz to 1200 MHz.

If the eNodeB 10 groups a plurality of transmission resources obtained after the time domain resources are grouped, and it is assumed that the coverage situation of the UE 20 in the cell is edge coverage, the eNodeB 10 may instruct the UE 20 to randomly select a sequence from a group a, for example, select a subframe 0 as a subframe of currently transmitted data. To be specific, the UE 20 sends the data to the eNodeB 10 on the subframe 0.

In a current scheduling-free transmission scheme, the eNodeB 10 cannot adaptively use, based on the coverage situation of the user equipment in the cell for the data sent by the user equipment, a transmission format that matches the user equipment, to receive and process the data, causing receiving performance of the eNodeB to be affected.

According to the data transmission method provided in this embodiment of the present application, the user equipment selects, based on the coverage situation of the user equipment in the cell, the target resource group from the plurality of transmission resource groups to send the data to the eNodeB, so that the eNodeB can configure, based on the transmission resource group of the transmission resource used when the user equipment sends the data, an appropriate transmission format for the user equipment, to process the data sent by the user equipment, so as to resolve a problem that the eNodeB cannot flexibly process, for the coverage situation of the user equipment, the data sent by the user equipment in a scheduling-free transmission process.

It should be understood that after determining the target resource group used when the user equipment sends the data, the eNodeB 10 may configure a modulation and coding scheme corresponding to the target resource group for the UE 20, or may configure a transmission code block size corresponding to the target resource group for the UE 20, or may configure both the modulation and coding scheme corresponding to the target resource group and the transmission code block size corresponding to the target resource group for the UE 20, or may configure another transmission format corresponding to the target resource group for the UE 20, for example, using different data demodulation schemes. This is not limited in the present application.

If the coverage situation of the UE 20 in the cell is edge coverage, the UE 20 may send the uplink data to the eNodeB 10 in a TTI bundling manner, and the eNodeB 10 may process, in a manner of joint demodulation and receiving, the data received in this bundled TTI.

Figure 7:
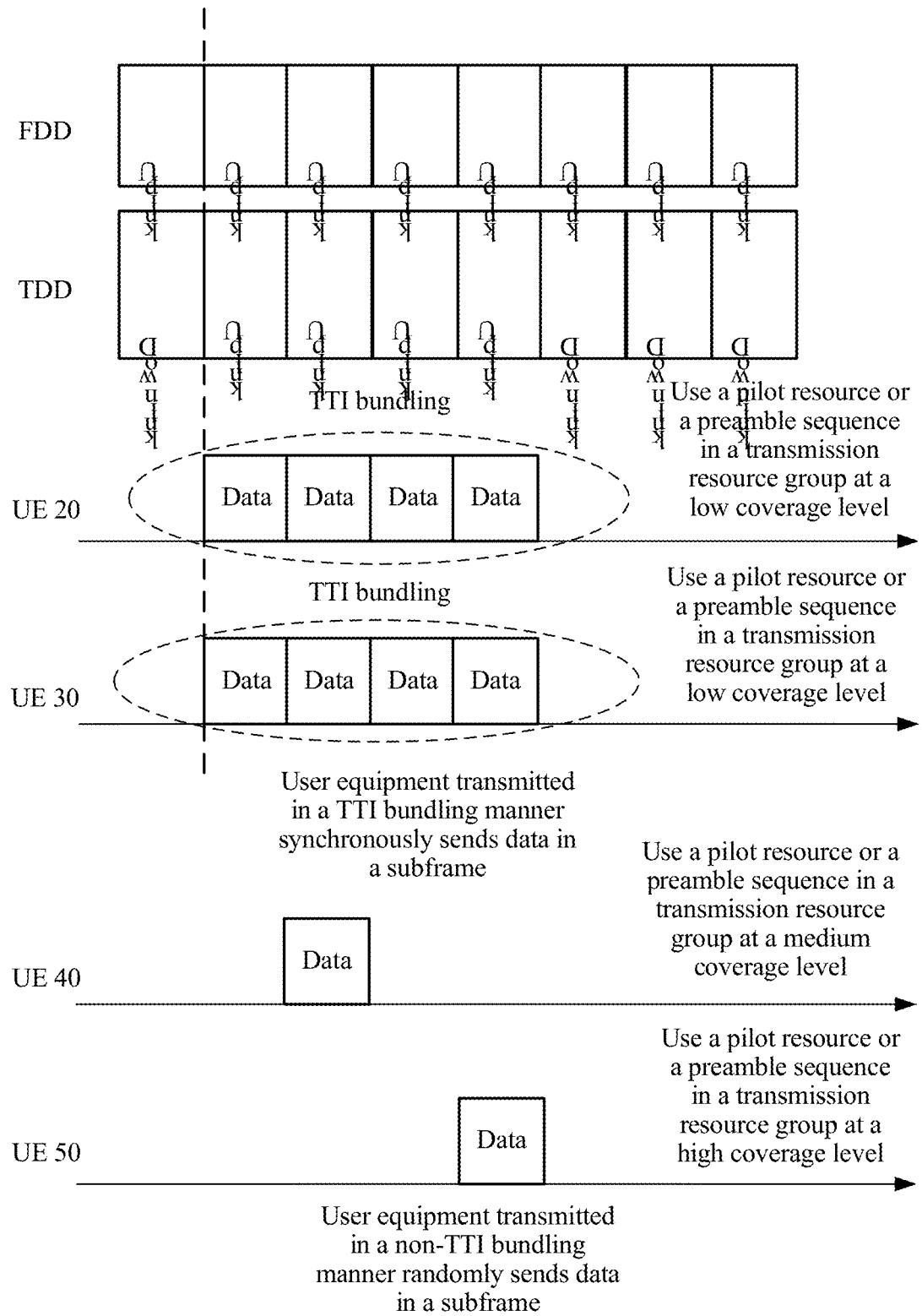
FIG. 7 is a schematic diagram of data transmission performed by user equipment of edge coverage in a TTI bundling transmission manner according to an embodiment of the present application.

FIG. 7 is a schematic diagram of data transmission performed by user equipment of edge coverage in a TTI bundling transmission manner according to an embodiment of the present application. According to scheduling-free transmission processes described in the embodiments of the present application in FIG. 3 and FIG. 4, an eNodeB 10 selects, based on a target resource group used when UE 20 sends data, a data processing manner that matches a transmission resource for the UE 20. If a coverage situation of the UE 20 in a cell is edge coverage, the UE 20 may send the data to the eNodeB 10 in a TTI bundling manner, and the eNodeB 10 receives uplink data sent by the UE 20 in the TTI bundling manner, and may perform joint receiving and demodulation on data sent by the UE 20 in a plurality of bundled TTIs, for example, perform HARQ combination processing on the data sent by the UE 20 in the plurality of bundled TTIs.

Optionally, if the target resource group is a corresponding transmission resource group when the coverage situation of the UE 20 in the cell is edge coverage, the method further includes:

sending, by the UE 20, the data to the eNodeB 10 in the plurality of bundled transmission time intervals TTIs, where a start TTI for sending the data is the same as a start TTI for sending data in the plurality of bundled TTIs by other UE that separately uses another transmission resource in the target resource group.

After receiving the data sent by the UE 20 in the plurality of bundled TTIs, the eNodeB 10 may further perform HARQ combination processing on received data that is sent by the UE 20 in each of the plurality of bundled TTIs.

Specifically, to further improve data receiving and processing performance of the user equipment, particularly in an application scenario with a high coverage requirement, when the coverage situation of the UE 20 in the cell currently is edge coverage, a repeated sending manner of TTI bundling may also be selected to further improve a coverage capability of a system. Different from TTI bundling in a conventional LTE protocol, a sending time of TTI bundling needs to be constrained in this embodiment of the present application. To be specific, timeslots for starting to send the data in the plurality of bundled TTIs by a plurality of user equipments that send the data in the TTI bundling manner need to be aligned. In other words, start TTIs for sending the data to the eNodeB 10 by the plurality of user equipments of the edge coverage are the same. However, in the plurality of bundled TTIs, another common user may still send data in a normal manner. To be specific, the start TTIs for sending the data in the plurality of bundled TTIs by the plurality of UEs that separately use a plurality of transmission resources in the target resource group should be the same, and the plurality of UEs may include the UE 20.

Figure 8:
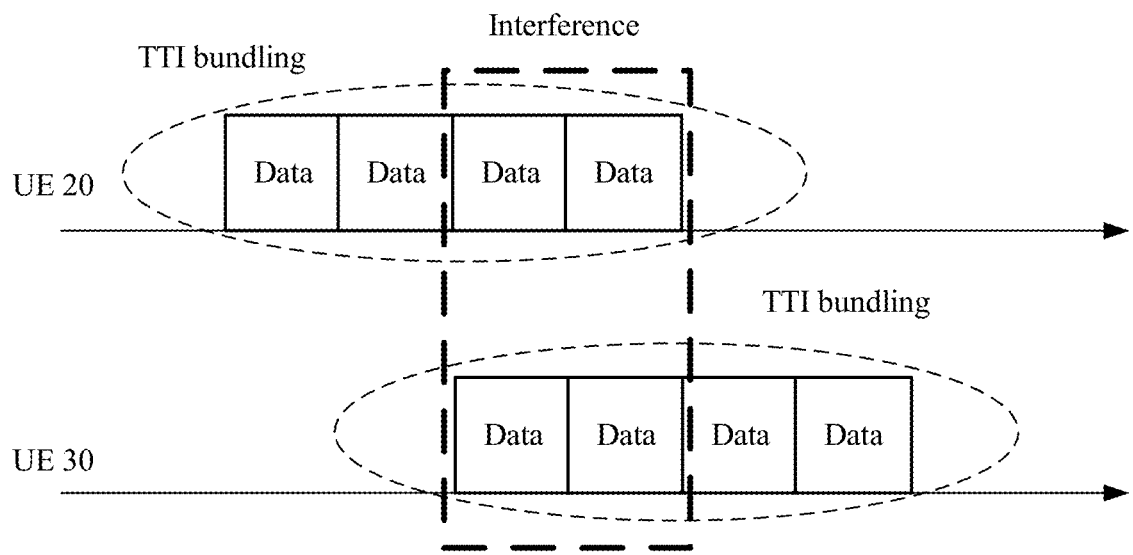
FIG. 8 is a schematic diagram of interference caused when data transmission times of user equipment using TTI bundling are not synchronous according to an embodiment of the present application.

As shown in FIG. 7, when the user equipment UE 20 of the edge coverage sends the data to the eNodeB 10 in the plurality of bundled TTIs in the TTI bundling manner, other user equipment of the edge coverage that sends the data in the TTI bundling manner, for example, UE 30 also sends data to the eNodeB in the plurality of bundled TTIs. In this case, start TTIs for sending the data by the UE 20 and the UE 30 need to be consistent. However, other user equipment of medium coverage, and user equipment of central coverage, for example, UE 40, may randomly send data in a TTI. FIG. 8 is a schematic diagram of interference caused when data transmission times of user equipment using TTI bundling are not synchronous. A pilot resource is used as an example. If start TTIs for sending data by UE 20 and UE 30 in a bundled TTI are different, because the user equipment uses a contention-based transmission manner in a scheduling-free scenario, when pilot resources that are randomly selected by the UE 20 and the UE 30 from a target resource group corresponding to edge coverage conflict, it is difficult for the eNodeB 10 to identify received data, and interference between user equipments is inevitable. However, if the UE 20 and the UE 30 are synchronous when sending the data in the bundled TTI, in this way, it is limited that the data of the user equipment in the plurality of bundled consecutive TTIs is unique. After receiving the data sent by the UE 20 and the UE 30 at the same time, if the eNodeB 10 finds that the UE 20 and the UE 30 occupy a same pilot resource, the eNodeB 10 can selectively receive data sent by one of the user equipments and discard data sent by the other user equipment. When user equipment that obtains the pilot resource by contention sends data in the plurality of bundled TTIs, the user equipment is not interfered with by data sent by other user equipment.

Figure 9:
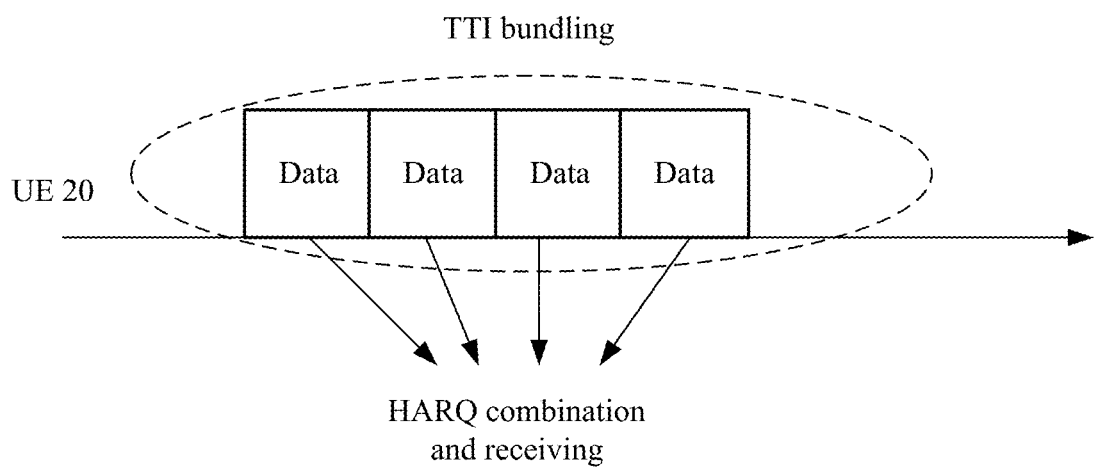
FIG. 9 is a schematic diagram of TTI bundling transmission in consecutive subframes according to an embodiment of the present application.

It should be understood that, if the user equipment of the edge coverage selects the TTI bundling manner for sending the data, the plurality of bundled TTIs may include time-consecutive TTIs, and may also include time-inconsecutive TTIs, for example, only a TTI for uplink transmission is bundled. This mainly depends on a configuration ratio of an uplink subframe to a downlink subframe in a system. Optionally, in this embodiment of the present application, a pattern of the TTI bundling may be determined by using a method that is agreed in advance based on subframe configuration. Specifically, referring to FIG. 9, FIG. 9 is a schematic diagram of TTI bundling in consecutive subframes according to an embodiment of the present application. UE 20 may bundle consecutive TTIs as a TTI used for sending data, or may bundle TTIs in an inconsecutive manner shown in FIG. 10. When the UE 20 in FIG. 9 sends the data in bundled TTIs, the bundled TTIs are consecutive at particular intervals.

Figure 10:
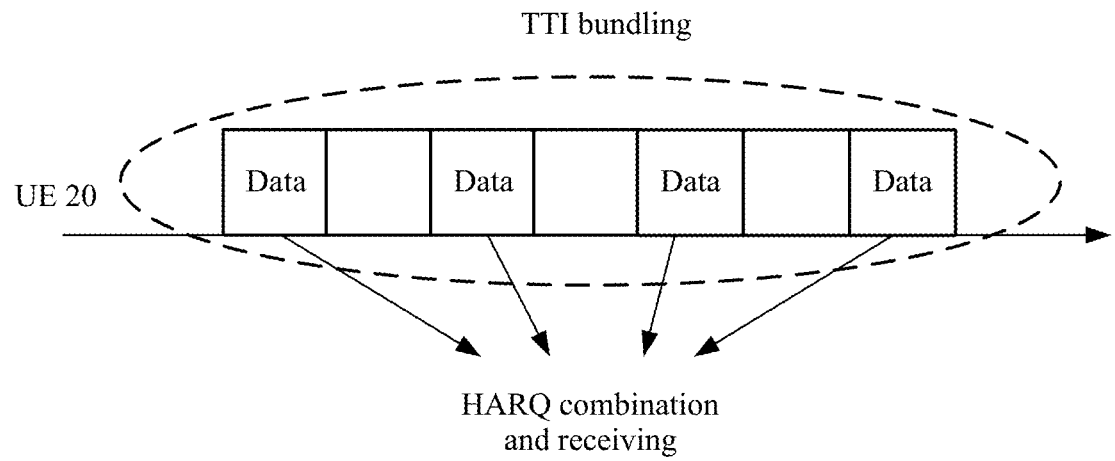
FIG. 10 is a schematic diagram of TTI bundling transmission in inconsecutive subframes according to an embodiment of the present application.

In addition, if the UE 20 sends the data to an eNodeB 10 in a TTI bundling manner, in the corresponding bundled TTIs, the eNodeB 10 may implement joint demodulation and receiving on data received in each TTI. Referring to FIG. 9 and FIG. 10, for example, the data sent by the UE 20 is combined in a HARQ combination and receiving manner, and demodulation and decoding are performed on combined data by using a lower-order low-code rate modulation and coding scheme.

It should be understood that the method for transmitting the data in the TTI bundling manner in this embodiment of the present application may be independently performed. To be specific, the eNodeB 10 may not determine, in a transmission resource group manner, a transmission format that matches a transmission resource used by the user equipment, but the UE 20 directly sends, when learning that a coverage situation of the UE 20 is the edge coverage, the data to the eNodeB 10 in a same start TTI as other user equipment of edge coverage in the TTI bundling manner on a transmission resource that is randomly selected and contended for. The eNodeB 10 selectively receives data sent by one of user equipments and discards data sent by other user equipment. When user equipment that obtains a pilot resource by contention sends data in the plurality of bundled TTIs, the user equipment is not interfered with by data sent by other user equipment.

Because a conventional TTI bundling transmission manner is based on eNodeB 10 scheduling, a receive end of the eNodeB 10 may be prescient through scheduling. However, in a scheduling-free scenario, the receive end of the eNodeB 10 cannot obtain the foregoing information. If it is implemented based on a full traversal scenario, complexity of a receiver sharply increases. Therefore, the full traversal scenario is usually not used.

In addition, in a scheduling-free transmission scheme, a physical layer can distinguish the user equipment of a current TTI by using only a pilot or a preamble sequence, but cannot fully identify an identity of the user equipment, and an ID of the user equipment is usually carried in a data packet header and can be parsed only by a data link layer. Therefore, the physical layer cannot maintain historical data of the user equipment. For a data packet with a demodulation error, both the physical layer and the data link layer cannot confirm a user equipment ID of the data packet. Therefore, a conventional hybrid automatic repeat request HARQ combination and receiving technology is difficult to use in the foregoing scenario. This directly affects receiving and processing performance for the data sent by the user equipment of the edge coverage.

However, in the data transmission method in this embodiment of the present application, a data sending time of the user equipment in the TTI bundling manner is limited to ensure that user data in a bundled TTI is unique, so as to resolve a problem that in a scheduling-free transmission process, the TTI bundling manner cannot be used to transmit the data and a HARQ combination technology cannot be used.

It should be understood that sequence numbers of the foregoing processes do not mean execution sequences. The execution sequences of the processes should be determined according to functions and internal logic of the processes, and should not be construed as any limitation on the implementation processes of the embodiments of the present application.

The foregoing describes in detail a data transmission method according to an embodiment of the present application with reference to FIG. 1 to FIG. 10. The following describes in detail user equipment and a base station for data transmission according to an embodiment of the present application with reference to FIG. 11 to FIG. 14.

Figure 11:
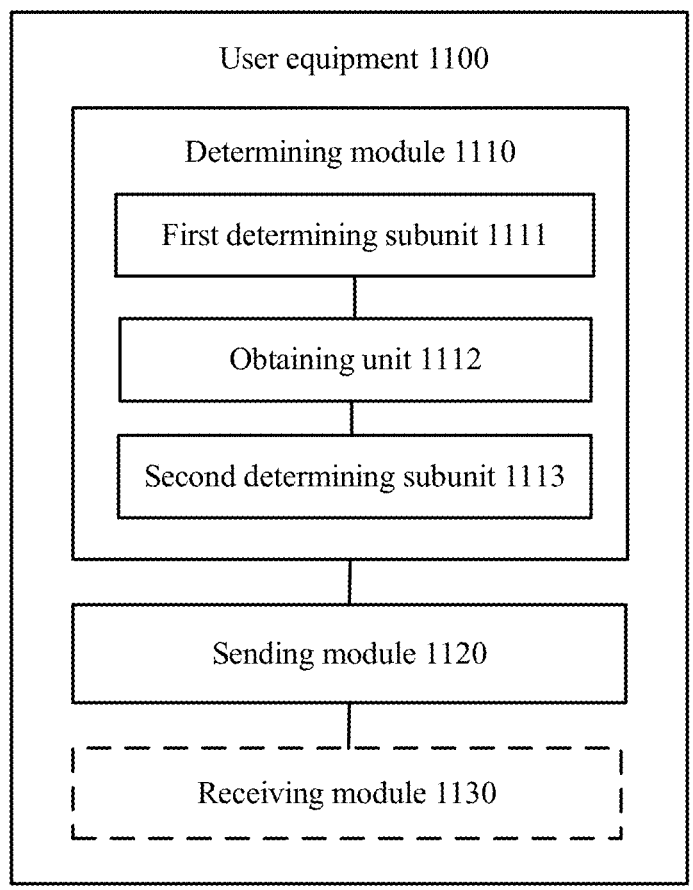
FIG. 11 is a structural block diagram of a base station according to an embodiment of the present application.

FIG. 11 is a structural block diagram of user equipment according to an embodiment of the present application. User equipment 1100 shown in FIG. 11 can be configured to perform processes implemented by the user equipment 20 in the method embodiment in FIG. 2. The user equipment is applied to a scheduling-free scenario of a base station for the user equipment. The user equipment 1100 shown in FIG. 11 includes a determining module 1110 and a sending module 1120.

The determining module 1110 is configured to determine a target resource group from a plurality of transmission resource groups.

The sending module 1120 is configured to send data to the base station by using a transmission resource in the target resource group determined by the determining module 1110, so that the base station performs data processing on the data by using a transmission format corresponding to the target resource group.

Therefore, in a scheduling-free transmission process, the user equipment selects the transmission resource in the target transmission resource group from the plurality of transmission resource groups to send the data to the base station, so that the base station can flexibly configure, for a coverage situation of the user equipment, an appropriate transmission format for the user equipment, to process the data sent by the user equipment.

Optionally, in another embodiment, the determining module 1110 includes:

a first determining subunit 1111, configured to determine a coverage situation of the UE in a cell, where the coverage situation is related to a location of the UE in the cell, and the location of the UE in the cell is related to a channel transmission condition of the UE;

an obtaining unit 1112, configured to obtain information about the plurality of transmission resource groups, where the plurality of transmission resource groups correspond to different transmission resources; and a second determining subunit 1113, configured to determine, based on the information about the plurality of transmission resource groups and the coverage situation of the UE, the target resource group corresponding to the coverage situation of the UE from the plurality of transmission resource groups.

Optionally, in another embodiment, the first determining subunit 1111 is specifically configured to:

receive coverage indication information that is used to indicate the coverage situation of the UE and that is sent by the base station.

Optionally, in another embodiment, the first determining subunit 1111 is specifically configured to:

determine the coverage situation of the UE based on a power of a last received downlink reference signal that is sent by the base station.

Optionally, in another embodiment, the obtaining unit 1112 is specifically configured to:

receive the information about the plurality of transmission resource groups sent by the base station.

Optionally, in another embodiment, the base station further includes:

a receiving module 1130, configured to receive resource indication information that is used to indicate the target resource group and that is sent by the base station.

Optionally, in another embodiment, before the determining module 1110 determines the target resource group from the plurality of transmission resource groups, the determining module 1110 is further configured to:

determine the coverage situation of the UE based on the power of the last received downlink reference signal that is sent by the base station; and the sending module 1120 is further configured to send, to the base station, the coverage indication information that is used to indicate the coverage situation of the UE.

Optionally, in another embodiment, if the target resource group determined by the UE is a corresponding transmission resource group when the coverage situation of the UE in the cell is edge coverage, the sending module 1120 is further configured to:

send the data to the base station in a plurality of bundled transmission time intervals TTIs, where a start TTI for sending the data is the same as a start TTI for sending data in the plurality of bundled TTIs by other UE that separately uses another transmission resource in the target resource group.

Optionally, the plurality of bundled TTIs include consecutive TTIs or inconsecutive TTIs.

Optionally, the transmission resource includes at least one of a preamble sequence, a pilot resource, a time domain resource, a frequency resource, a code word resource, and a beam resource.

Optionally, the transmission format includes at least one of a transmission code block size, a data modulation order, and a data encoding scheme.

Figure 12:
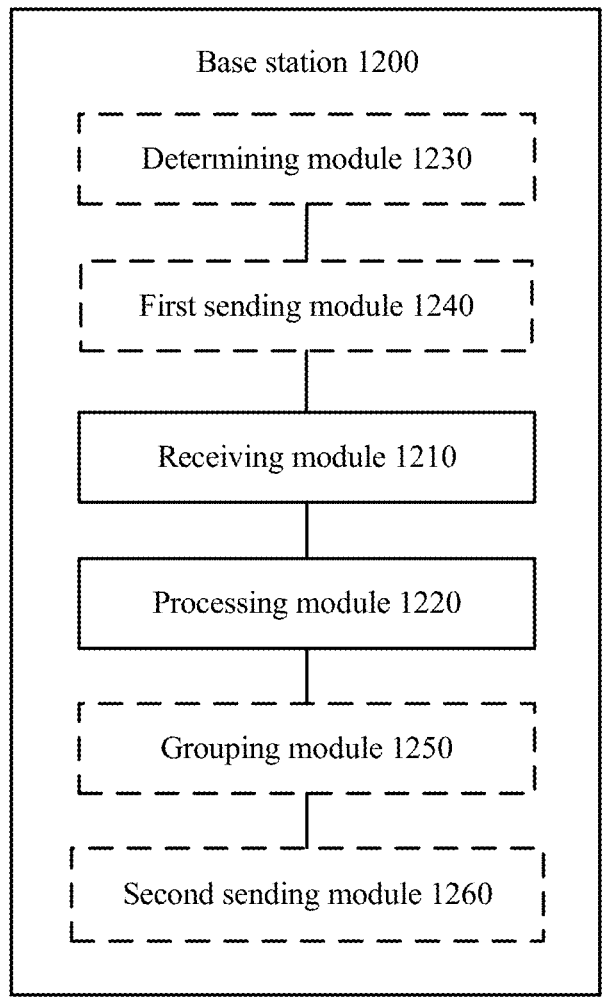
FIG. 12 is a structural block diagram of user equipment according to an embodiment of the present application.

FIG. 12 is a structural block diagram of a base station according to an embodiment of the present application. A base station 1100 shown in FIG. 12 can be configured to perform processes implemented by an eNodeB 10 in the method embodiment in FIG. 3. The base station 1200 shown in FIG. 12 includes a receiving module 1210 and a processing module 1220.

The receiving module 1210 is configured to receive, on a transmission resource in a target resource group, data sent by the UE.

The processing module 1220 is configured to perform, by using a transmission format corresponding to the target resource group, data processing on the data received by the receiving module 1210.

Therefore, the base station configures, based on the target transmission resource group of the transmission resource used when the user equipment sends the data, an appropriate transmission format for the user equipment, to process the data sent by the user equipment, so that the base station can flexibly process, for a coverage situation of the user equipment in a scheduling-free transmission process, the data sent by the user equipment.

Optionally, in another embodiment, before the receiving module 1210 receives, on the transmission resource in the target resource group, the data sent by the UE, the base station further includes:

a determining module 1230, configured to determine the coverage situation of the UE in a cell, where the coverage situation is related to a location of the UE in the cell, and the location of the UE in the cell is related to a channel transmission condition of the UE.

The determining module 1230 is further configured to:

determine information about a plurality of transmission resource groups, where the plurality of transmission resource groups correspond to different transmission resources; and determine, based on the information about the plurality of transmission resource groups and the coverage situation of the UE, the target resource group corresponding to the coverage situation of the UE from the plurality of transmission resource groups.

A first sending module 1240 is configured to send, to the UE, resource indication information that is used to indicate the target resource group determined by the determining module.

Optionally, in another embodiment, the determining module 1230 is specifically configured to:

determine the coverage situation of the UE in the cell based on a power of a last received uplink reference signal that is sent by the UE.

Optionally, in another embodiment, the determining module 1230 is specifically configured to:

receive coverage indication information that is used to indicate the coverage situation of the UE and that is sent by the UE.

Optionally, in another embodiment, the determining module 1230 includes:

a grouping unit, configured to classify available transmission resources into the plurality of transmission resource groups.

Optionally, in another embodiment, before the receiving module 1210 receives, on the transmission resource in the target resource group, the data sent by the UE, the base station further includes:

a grouping module 1250, configured to classify the available transmission resources into the plurality of transmission resource groups, where the plurality of transmission resource groups correspond to different transmission resources, and the plurality of transmission resource groups include the target resource group; and a second sending module 1260, configured to send the information about the plurality of transmission resource groups to the UE, so that the UE determines the target resource group from the plurality of transmission resource groups.

Optionally, in another embodiment, if the target resource group is a corresponding transmission resource group when the coverage situation of the UE in the cell is edge coverage, the receiving module 1210 is specifically configured to:

receive the data sent by the UE in a plurality of bundled transmission time intervals TTIs, where a start TTI for sending the data is the same as a start TTI for sending data in the plurality of bundled TTIs by other UE that separately uses another transmission resource in the target resource group.

Optionally, in another embodiment, the processing module 1120 is specifically configured to:

perform hybrid automatic repeat request HARQ combination processing on received data that is sent by the UE in each of the plurality of bundled TTIs.

Optionally, in another embodiment, the plurality of bundled TTIs include consecutive TTIs or inconsecutive TTIs.

Optionally, in another embodiment, the transmission resource includes at least one of a preamble sequence, a pilot resource, a time domain resource, a frequency resource, a code word resource, and a beam resource.

Optionally, in another embodiment, the transmission format includes at least one of a transmission code block size, a data modulation order, and a data encoding scheme.

Figure 13:
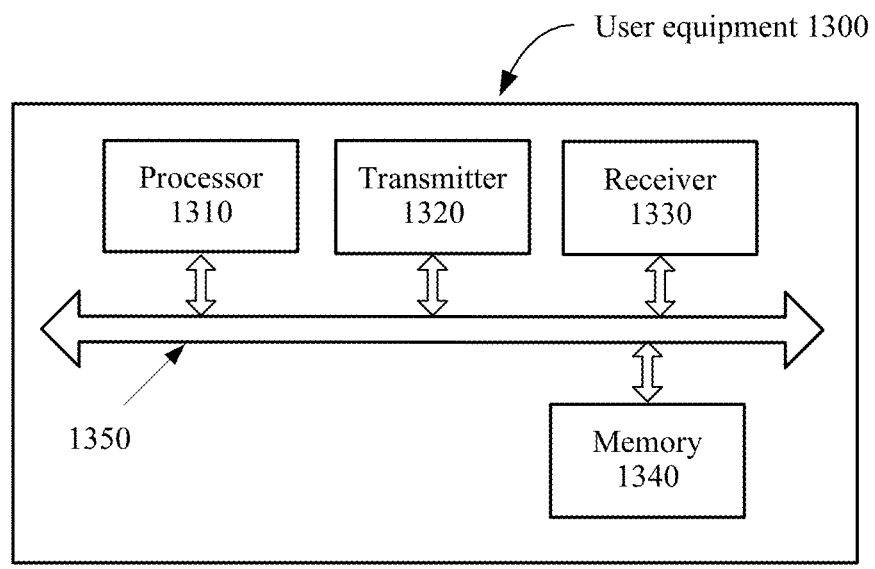
FIG. 13 is a structural block diagram of a base station according to an embodiment of the present application.

FIG. 13 shows user equipment according to an embodiment of the present application. The user equipment 1200 includes a processor 1310, a transmitter 1320, a receiver 1330, a memory 1340, and a bus system 1350. The processor 1310, the transmitter 1320, the receiver 1330, and the memory 1340 are interconnected by using the bus system 1350. The memory 1340 is configured to store an instruction. The processor 1310 is configured to execute the instruction stored in the memory 1340, so as to control the transmitter 1320 to send a signal and control the receiver 1330 to receive a signal. The receiver 1330 and the transmitter 1320 may be collectively referred to as a transceiver. The processor 1310, the transmitter 1320, the receiver 1330, the memory 1340, and the bus system 1350 may be implemented by using one or more chips. For example, the processor 1310, the transmitter 1320, the receiver 1330, the memory 1340, and the bus system 1350 may be fully integrated into one chip, or the processor 1310, the transmitter 1320, the receiver 1330, and the bus system 1350 may be integrated into one chip, and the memory 1340 is integrated into another chip. A specific form is not limited herein. The processor 1310 is specifically configured to:

determine a target resource group from a plurality of transmission resource groups.

The transmitter 1320 is configured to send data to the base station by using a transmission resource in the target resource group determined by the determining module, so that the base station performs data processing on the data by using a transmission format corresponding to the target resource group.

It should be understood that the user equipment may be specifically user equipment 20 in the foregoing embodiments, and may be configured to perform steps and/or procedures corresponding to the user equipment 20 in the foregoing method embodiments. Optionally, the memory 1340 may include a read-only memory and a random access memory, and provide an instruction and data to the processor 1310. A part of the memory 1340 may further include a nonvolatile random access memory. For example, the memory 1340 may further store information about a device type. The processor 1310 may be configured to execute the instruction stored in the memory 1340. When the processor 1310 executes the instruction stored in the memory 1340, the processor 1310 is configured to perform the steps and/or the procedures in the foregoing method embodiments.

Optionally, in another embodiment, the processor 1310 is specifically configured to:

determine a coverage situation of the UE in a cell, where the coverage situation is related to a location of the UE in the cell, and the location of the UE in the cell is related to a channel transmission condition of the UE;

obtain information about a plurality of transmission resource groups, where the plurality of transmission resource groups correspond to different transmission resources; and determine, based on the information about the plurality of transmission resource groups and the coverage situation of the UE, the target resource group corresponding to the coverage situation of the UE from the plurality of transmission resource groups.

Optionally, in another embodiment, the processor 1310 is specifically configured to:

receive coverage indication information that is used to indicate the coverage situation of the UE and that is sent by the base station.

Optionally, in another embodiment, the processor 1310 is specifically configured to:

determine the coverage situation of the UE based on a power of a last received downlink reference signal that is sent by the base station.

Optionally, in another embodiment, the processor 1310 is specifically configured to:

receive the information about the plurality of transmission resource groups sent by the base station.

Optionally, in another embodiment, the receiver 1330 is configured to:

receive resource indication information that is used to indicate the target resource group and that is sent by the base station.

Optionally, in another embodiment, before the processor 1310 determines the target resource group from the plurality of transmission resource groups, the processor 1310 is further configured to:

determine the coverage situation of the UE based on the power of the last received downlink reference signal that is sent by the base station; and the transmitter 1320 is further configured to send, to the base station, the coverage indication information that is used to indicate the coverage situation of the UE.

Optionally, in another embodiment, if the target resource group determined by the UE is a corresponding transmission resource group when the coverage situation of the UE in the cell is edge coverage, the transmitter 1320 is further configured to:

send the data to the base station in a plurality of bundled transmission time intervals TTIs, where a start TTI for sending the data is the same as a start TTI for sending data in the plurality of bundled TTIs by other UE that separately uses another transmission resource in the target resource group.

Optionally, the plurality of bundled TTIs include consecutive TTIs or inconsecutive TTIs.

Optionally, the transmission resource includes at least one of a preamble sequence, a pilot resource, a time domain resource, a frequency resource, a code word resource, and a beam resource.

Optionally, the transmission format includes at least one of a transmission code block size, a data modulation order, and a data encoding scheme.

Figure 14:
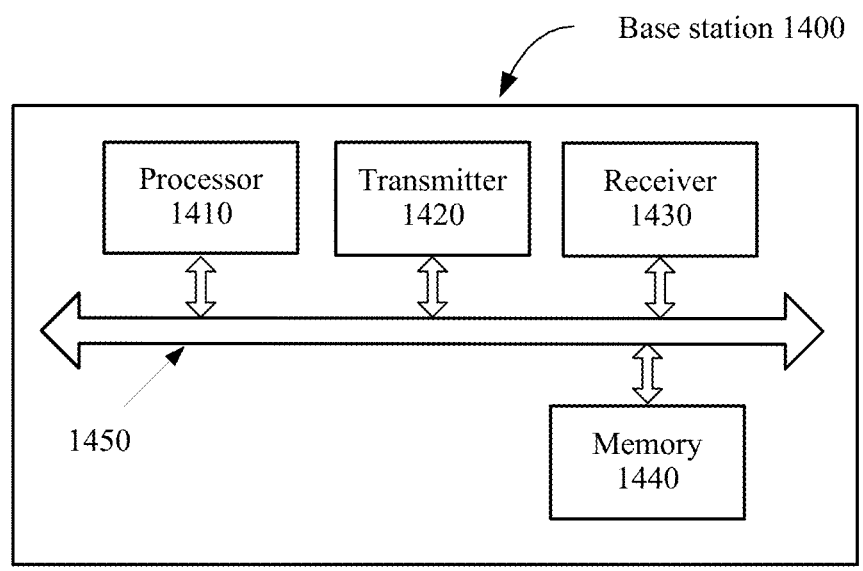
FIG. 14 is a structural block diagram of user equipment according to an embodiment of the present application.

FIG. 14 shows a base station according to an embodiment of the present application. The base station 1300 includes a processor 1313, a transmitter 1420, a receiver 1430, a memory 1440, and a bus system 1450. The processor 1414, the transmitter 1420, the receiver 1430, and the memory 1440 are interconnected by using the bus system 1450. The memory 1440 is configured to store an instruction. The processor 1414 is configured to execute the instruction stored in the memory 1440, so as to control the transmitter 1420 to send a signal and control the receiver 1430 to receive a signal. The processor 1414, the transmitter 1420, the receiver 1430, the memory 1440, and the bus system 1450 may be implemented by using one or more chips. For example, the processor 1414, the transmitter 1420, the receiver 1430, the memory 1440, and the bus system 1450 may be fully integrated into one chip, or the processor 1414, the transmitter 1420, the receiver 1430, and the bus system 1450 may be integrated into one chip, and the memory 1440 is integrated into another chip. A specific form is not limited herein. The receiver 1430 is specifically configured to:

receive, on a transmission resource in a target resource group, data sent by the UE.

The processor 1410 is configured to perform data processing on the data by using a transmission format corresponding to the target resource group.

It should be understood that, the base station may be specifically an eNodeB 10 in the foregoing embodiments, and may be configured to perform steps and/or procedures corresponding to the eNodeB 10 in the foregoing method embodiments. Optionally, the memory 1440 may include a read-only memory and a random access memory, and provide an instruction and data to the processor 1413. A part of the memory 1440 may further include a nonvolatile random access memory. For example, the memory 1440 may further store information about a device type. The processor 1413 may be configured to execute the instruction stored in the memory 1440. When the processor 1413 executes the instruction stored in the memory 1440, the processor 1413 is configured to perform the steps and/or the procedures in the foregoing method embodiments.

Optionally, in another embodiment, before the receiver 1430 receives, on the transmission resource in the target resource group, the data sent by the UE, the processor 1413 is further configured to:

determine a coverage situation of the UE in a cell, where the coverage situation is related to a location of the UE in the cell, and the location of the UE in the cell is related to a channel transmission condition of the UE;

determine information about a plurality of transmission resource groups, where the plurality of transmission resource groups correspond to different transmission resources; and determine, based on the information about the plurality of transmission resource groups and the coverage situation of the UE, the target resource group corresponding to the coverage situation of the UE from the plurality of transmission resource groups.

The transmitter 1420 is configured to send, to the UE, resource indication information that is used to indicate the target resource group determined by the determining module.

Optionally, in another embodiment, the processor 1413 is specifically configured to:

determine the coverage situation of the UE in the cell based on a power of a last received uplink reference signal that is sent by the UE.

Optionally, in another embodiment, the receiver 1430 is further configured to:

receive coverage indication information that is used to indicate the coverage situation of the UE and that is sent by the UE.

Optionally, in another embodiment, the processor 1413 is specifically configured to:

classify available transmission resources into the plurality of transmission resource groups.

Optionally, in another embodiment, before the receiver 1430 receives, on the transmission resource in the target resource group, the data sent by the UE, the processor 1413 is further configured to:

classify available transmission resources into the plurality of transmission resource groups, where the plurality of transmission resource groups correspond to different transmission resources, and the plurality of transmission resource groups include the target resource group.

The transmitter 1420 is configured to send the information about the plurality of transmission resource groups to the UE, so that the UE determines the target resource group from the plurality of transmission resource groups.

Optionally, in another embodiment, if the target resource group is a corresponding transmission resource group when the coverage situation of the UE in the cell is edge coverage, the receiver 1430 is specifically configured to:

receive the data sent by the UE in a plurality of bundled transmission time intervals TTIs, where a start TTI for sending the data is the same as a start TTI for sending data in the plurality of bundled TTIs by other UE that separately uses another transmission resource in the target resource group.

Optionally, in another embodiment, the processor 1413 is specifically configured to:

perform hybrid automatic repeat request HARQ combination processing on received data that is sent by the UE in each of the plurality of bundled TTIs.

Optionally, the plurality of bundled TTIs include consecutive TTIs or inconsecutive TTIs.

Optionally, the transmission resource includes at least one of a preamble sequence, a pilot resource, a time domain resource, a frequency resource, a code word resource, and a beam resource.

Optionally, the transmission format includes at least one of a transmission code block size, a data modulation order, and a data encoding scheme.

Based on the foregoing technical solutions, according to the data transmission method in the embodiments of the present application, the user equipment selects the target resource group from the plurality of transmission resource groups to send the data to the base station, and the base station determines the target resource group of the transmission resource used when the user equipment sends the data, so as to flexibly select the appropriate transmission format to process the data sent by the user equipment in the scheduling-free transmission process, and improve data receiving and processing performance of the base station.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

It should be understood that, the processor in the embodiments of the present application may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In an implementation process, steps in the foregoing methods can be implemented by using a hardware integrated logic circuit in the processor, or by using instructions in a form of software. The steps of the method disclosed with reference to the embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method, the method comprising:
   receiving, by a user equipment (UE) from a base station, coverage indication information that indicates a current coverage situation of the UE;
   determining, by the UE using the coverage indication information received from the base station, a target resource group from a plurality of transmission resource groups, wherein transmission resources of the plurality of transmission resource groups are scheduling-free transmission resources; and
   sending, by the UE, data to the base station by using a transmission resource in the target resource group.

2. The method according to claim 1, wherein determining, by the UE using the coverage indication information received from the base station, the target resource group from the plurality of transmission resource groups comprises:
   determining, by the UE using the coverage indication information received from the base station, the current coverage situation of the UE in a cell, wherein the coverage situation is related to a location of the UE in the cell, and the location of the UE in the cell is related to a channel transmission condition of the UE;
   obtaining, by the UE, information about the plurality of transmission resource groups, wherein the plurality of transmission resource groups correspond to different transmission resources; and
   determining, by the UE based on the information about the plurality of transmission resource groups and the coverage situation of the UE, the target resource group corresponding to the coverage situation of the UE from the plurality of transmission resource groups.

3. The method according to claim 2, wherein obtaining, by the UE, information about the plurality of transmission resource groups comprises:
   receiving, by the UE, the information about the plurality of transmission resource groups sent by the base station.

4. A user equipment (UE), comprising:
   a processor;
   a non-transitory memory coupled to the processor, the a non-transitory memory comprising instructions that, when executed by the processor, cause the UE to:
      receive resource indication information from a base station, wherein the resource indication information indicates a target resource group of a plurality of transmission resource groups, wherein transmission resources of the plurality of transmission resource groups are scheduling-free transmission resources;
      determine the target resource group from the plurality of transmission resource groups using the resource indication information; and
      send data to the base station by using a transmission resource in the determined target resource group.

5. The user equipment according to claim 4, wherein the non-transitory memory comprises instructions that, when executed by the processor, cause the UE to:
   obtain information about the plurality of transmission resource groups, wherein the plurality of transmission resource groups correspond to different transmission resources.

6. The user equipment according to claim 5, wherein the non-transitory memory comprises instructions that, when executed by the processor, cause the UE to:
   receive the information about the plurality of transmission resource groups sent by the base station.

7. A base station, comprising:
   a processor;
   a non-transitory memory coupled to the processor, the non-transitory memory comprising instructions that, when executed by the processor, cause the base station to:
      determine a current coverage situation of a user equipment (UE) in a cell, wherein the coverage situation is related to a location of the UE in the cell, and the location of the UE in the cell is related to a channel transmission condition of the UE;
      send, to the UE, coverage indication information that indicates the current coverage situation of the UE;
      determine, based on information about a plurality of transmission resource groups and the coverage situation of the UE, a target resource group corresponding to the coverage situation of the UE from the plurality of transmission resource groups;

receive, on a transmission resource in the target resource group, data sent by the UE; and perform, by using a transmission format corresponding to the target resource group, data processing on the data sent by the UE.

8. The base station according to claim 7, wherein the non-transitory memory comprises instructions that, when executed by the processor, cause the base station to:

determine the information about the plurality of transmission resource groups, wherein the plurality of transmission resource groups correspond to different transmission resources.

9. The base station according to claim 8, wherein the memory comprises instructions that, when executed by the processor, cause the base station to:

classify available transmission resources into the plurality of transmission resource groups.

10. The base station according to claim 7, wherein the non-transitory memory comprises instructions that, when executed by the processor, cause the base station to:

before receiving the data sent by the UE:

classify available transmission resources into the plurality of transmission resource groups, wherein the plurality of transmission resource groups correspond to different transmission resources, and the plurality of transmission resource groups comprise the target resource group; and send the information about the plurality of transmission resource groups to the UE.

11. The method according to claim 1, wherein when the current coverage situation of the UE is central coverage, the data sent by the UE is processed using a higher-order high-code rate modulation and demodulation scheme than when the current coverage situation of the UE is edge coverage.

12. The method according to claim 1, wherein when the current coverage situation of the UE is central coverage, the data sent by the UE is processed using a higher-order high-code rate modulation and demodulation scheme than when the current coverage situation of the UE is medium coverage.

13. The method according to claim 1, wherein when the current coverage situation of the UE is edge coverage, the data sent by the UE is processed using a lower-order low-code rate modulation and demodulation scheme than when the current coverage situation of the UE is central coverage.

14. The method according to claim 1, wherein the current coverage situation of the UE is selected from a plurality of coverage situations, and the plurality of coverage situations are central coverage, edge coverage, and medium coverage.

* * * * *